United States Patent
Fehrenbach et al.

(10) Patent No.: US 11,764,938 B2
(45) Date of Patent: *Sep. 19, 2023

(54) USER EQUIPMENT, BASE STATIONS AND WIRELESS COMMUNICATIONS SYSTEM FOR ULTRA-RELIABLE COMMUNICATIONS

(71) Applicant: Fraunhofer-Gesellschaft zur Foerderung der angewandten Forschung e.V., Munich (DE)

(72) Inventors: Thomas Fehrenbach, Berlin (DE); Lars Thiele, Berlin (DE); Cornelius Hellge, Berlin (DE); Thomas Wirth, Kleinmachnow (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/558,214

(22) Filed: Dec. 21, 2021

(65) Prior Publication Data
US 2022/0116195 A1     Apr. 14, 2022

Related U.S. Application Data

(63) Continuation of application No. 16/401,903, filed on May 2, 2019, now Pat. No. 11,239,986, which is a
(Continued)

(30) Foreign Application Priority Data
Nov. 3, 2016   (EP) .................................... 16197141

(51) Int. Cl.
*H04L 5/14*      (2006.01)
*H04L 27/26*    (2006.01)
(Continued)

(52) U.S. Cl.
CPC ......... *H04L 5/1469* (2013.01); *H04B 7/2643* (2013.01); *H04L 27/2607* (2013.01);
(Continued)

(58) Field of Classification Search
CPC . H04L 5/1469; H04L 27/2607; H04B 7/2643; H04W 88/08; H04W 88/02; H04W 72/0446; H04W 56/0045
See application file for complete search history.

(56) References Cited

U.S. PATENT DOCUMENTS

| 8,145,733 B1 | 3/2012 | Cheng et al. |
| 8,780,790 B2 | 7/2014 | Sarkar |

(Continued)

FOREIGN PATENT DOCUMENTS

| CN | 101183897 A | 5/2008 |
| EP | 1511190 A1 | 3/2005 |

(Continued)

OTHER PUBLICATIONS

"3GPP TS 36.321 V13.1.0 (Mar. 2016)", 3GPP TS 36.321 V13.1.0 (Mar. 2016), p. 42ff.
(Continued)

*Primary Examiner* — Mounir Moutaouakil
(74) *Attorney, Agent, or Firm* — Perkins Coie LLP; Michael A. Glenn

(57) ABSTRACT

A user equipment is configured to operate in a wireless communications network being operated in a TDD scheme, the TDD scheme including a plurality of TDD-frames, each TDD-frame including a guard period arranged between a downlink symbol and an uplink symbol of the TDD-frame. The user equipment is configured to receive a first number of symbols during the guard period or is configured to transmit the uplink symbol and to transmit a second number of symbols previous to transmitting the uplink symbol.

19 Claims, 23 Drawing Sheets

Related U.S. Application Data continuation of application No. PCT/EP2017/076678, filed on Oct. 19, 2017.

(51) Int. Cl.
    *H04W 56/00*     (2009.01)
    *H04W 72/0446*     (2023.01)
    *H04W 88/02*     (2009.01)
    *H04W 88/08*     (2009.01)
    *H04B 7/26*     (2006.01)

(52) U.S. Cl.
    CPC ... *H04W 56/0045* (2013.01); *H04W 72/0446* (2013.01); *H04W 88/02* (2013.01); *H04W 88/08* (2013.01)

(56) References Cited

U.S. PATENT DOCUMENTS

| | | |
|---|---|---|
| 2007/0019667 A1 | 1/2007 | Mottier et al. |
| 2008/0102753 A1 | 5/2008 | Brunel et al. |
| 2008/0240003 A1 | 10/2008 | Brunel et al. |
| 2009/0059820 A1 | 3/2009 | Jung et al. |
| 2013/0039233 A1 | 2/2013 | Dai et al. |
| 2014/0092880 A1 | 4/2014 | Wang et al. |
| 2015/0043392 A1 | 2/2015 | Susitaival et al. |
| 2015/0103819 A1 | 4/2015 | Fujishiro |
| 2016/0337109 A1 | 11/2016 | Yasukawa et al. |
| 2017/0079026 A1 | 3/2017 | Li et al. |
| 2018/0343682 A1 | 11/2018 | Tang et al. |
| 2019/0044692 A1* | 2/2019 | Li ............ H04L 1/0007 |
| 2019/0159191 A1* | 5/2019 | Kim ............ H04L 5/0094 |
| 2020/0314840 A1* | 10/2020 | Golitschek Edler Von Elbwart ............ H04W 72/0446 |

FOREIGN PATENT DOCUMENTS

| | | |
|---|---|---|
| EP | 1746743 A1 | 1/2007 |
| EP | 1919102 A1 | 5/2008 |
| EP | 1746743 B1 | 1/2010 |
| JP | 2007037128 A | 2/2007 |
| JP | 2008125067 A | 5/2008 |
| JP | 2015133642 A | 7/2015 |
| JP | 2016105621 A | 6/2016 |
| RU | 2468539 C2 | 11/2012 |
| WO | 2015154310 A1 | 10/2015 |
| WO | 2016146352 A1 | 9/2016 |
| WO | 2016165126 A1 | 10/2016 |

OTHER PUBLICATIONS

"3GPP TS 36.331 V13.1.0 (Mar. 2016)", 3GPP TS 36.331 V13.1.0 (Mar. 2016), p. 354.

"Review of physical layer details of MBSFN CRs (FDD & TDD)", 3GPP Draft; R1-071627.

Fujitsu, "Guard period setting in TDD based NR frame structure", 3GPP TSG-RAN WG1#86b R1-1608806 (Sep. 30, 2016), Sep. 30, 2016, Sep. 30, 2016.

* cited by examiner

| Uplink-downlink configuration | Downlink to uplink switch periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Fig. 3a

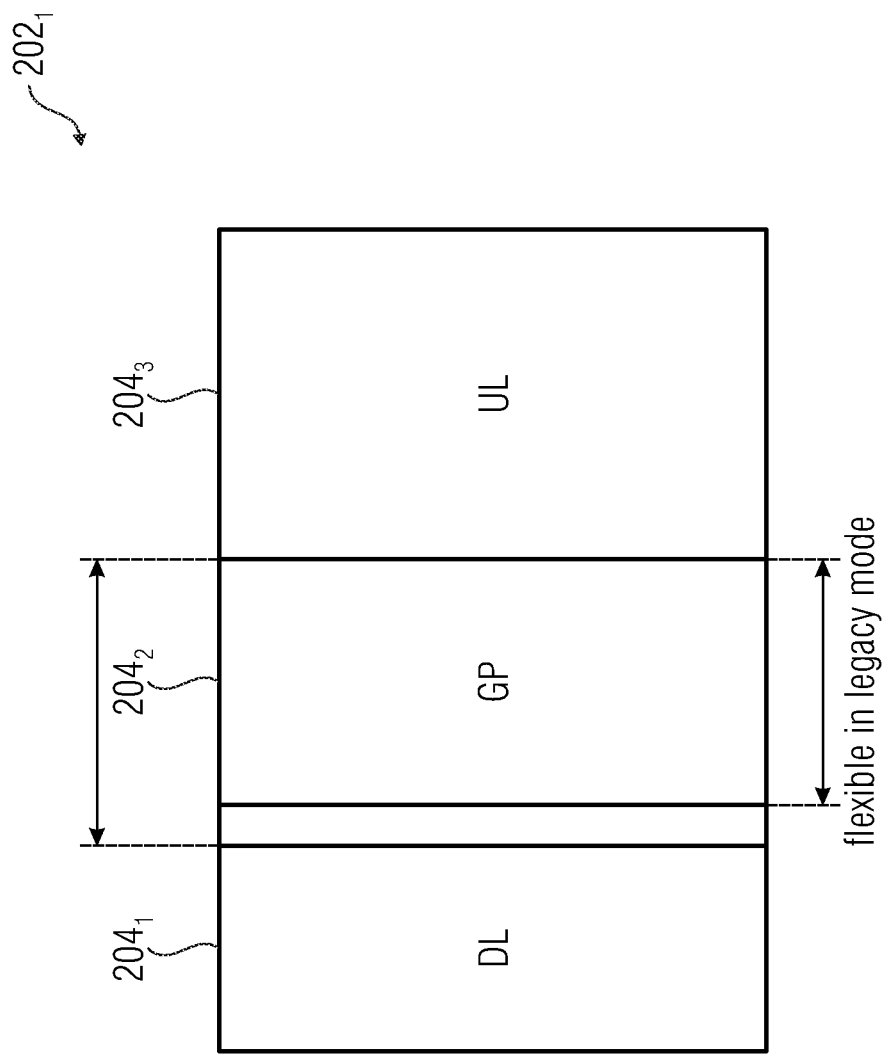

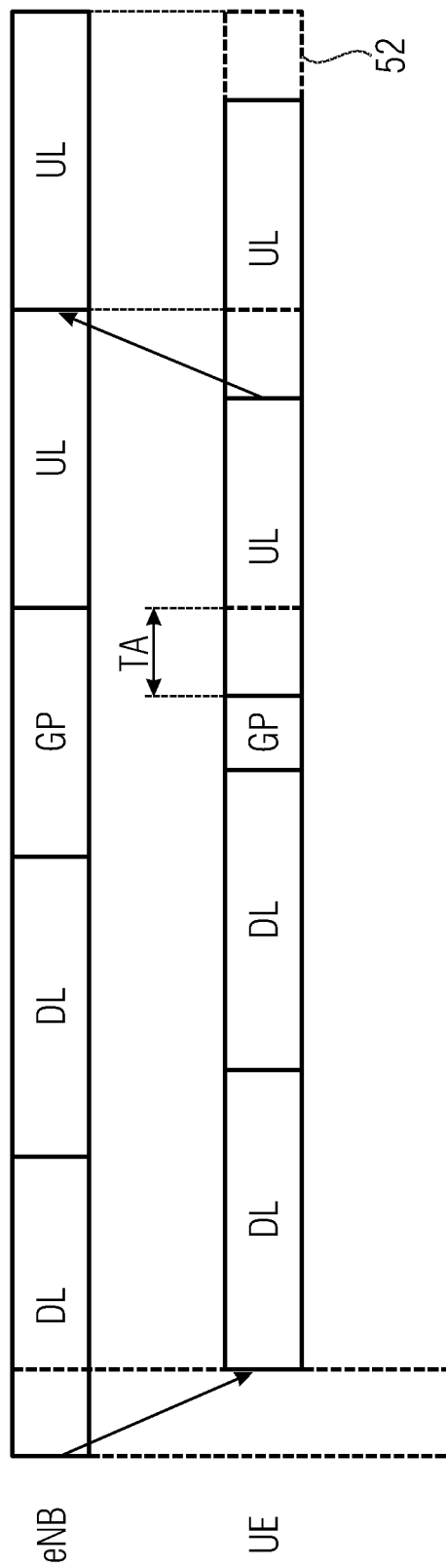

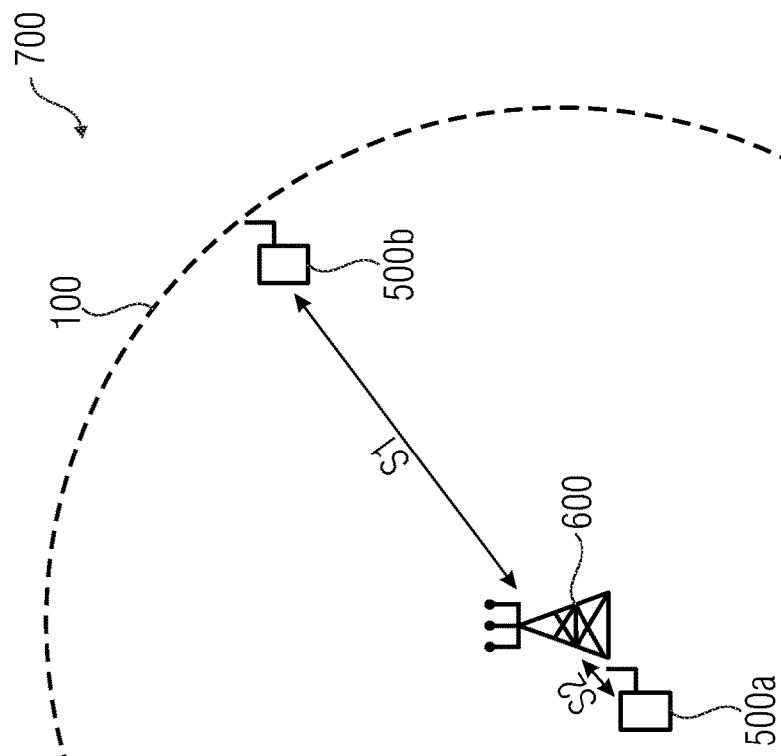

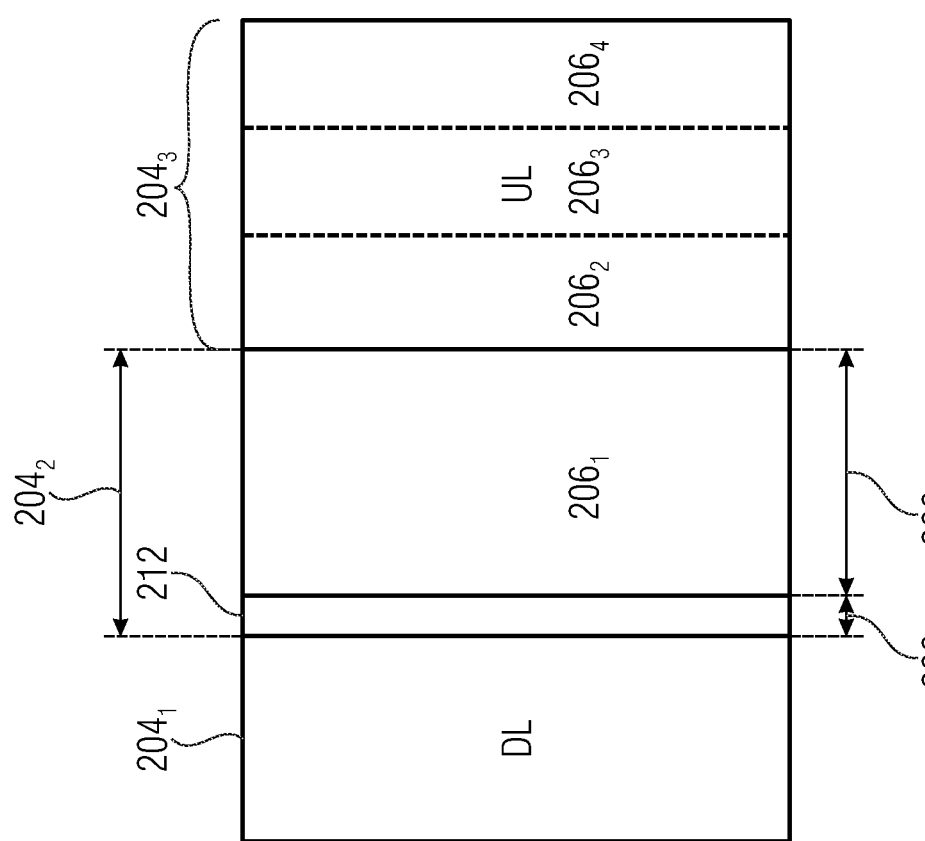

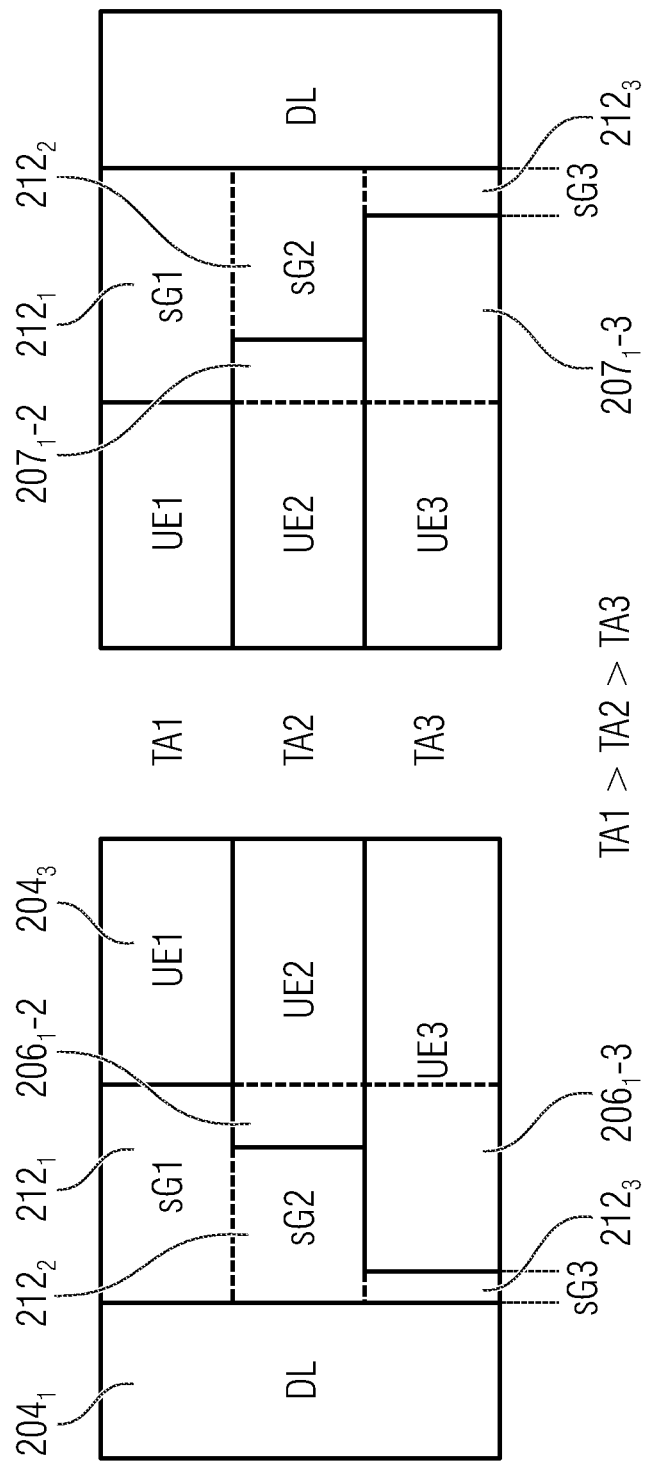

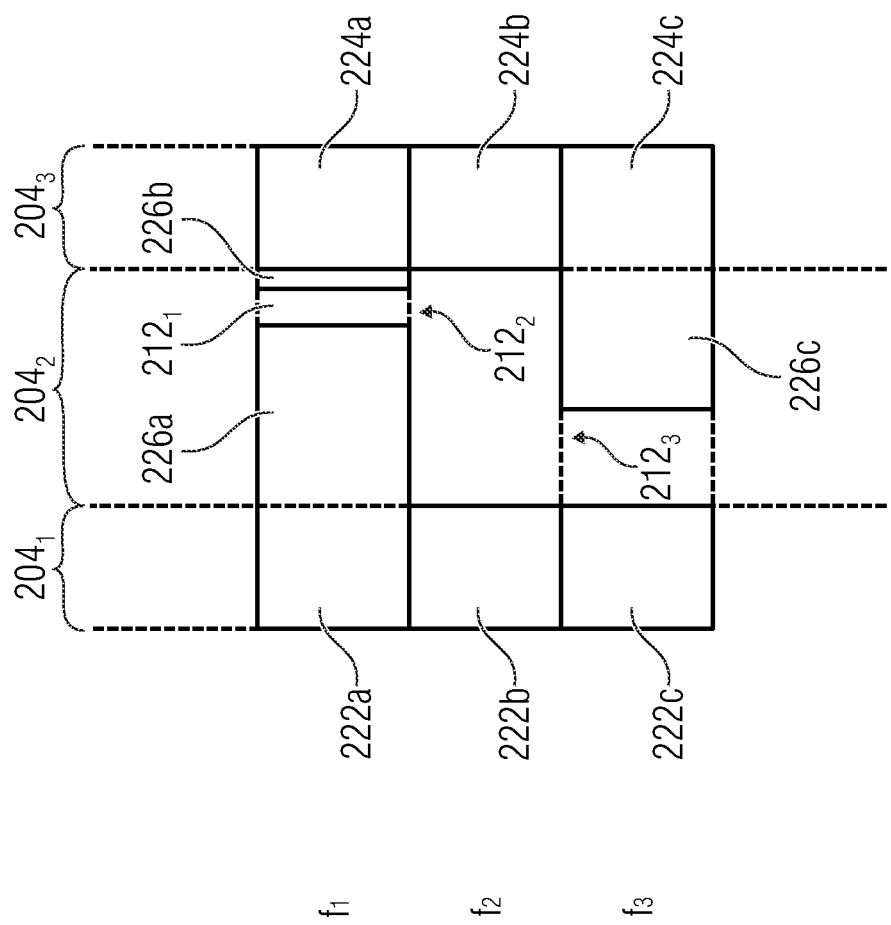

| Format 1 (Release 8) - C-RNTI, SPS C-RNTI | | |
|---|---|---|
| Field Name | Length (Bits) | Comment |
| Resource allocation header | 1 | RA type 0 or RA type 1 |
| Resource block assignment for RA Type 0 | 6 (1.4 MHz)<br>8 (3 MHz)<br>13 (5 MHz)<br>17 (10 MHz)<br>19 (15 MHz)<br>25 (20 MHz) | Applicable only when Resource allocation header = 0 (RA Type 0)<br>Refer to RA Type page |
| Subset | N/A (1.4 MHz)<br>1 (3 MHz)<br>1 (5 MHz)<br>2 (10 MHz)<br>2 (15 MHz)<br>2 (20 MHz) | Applicable only when Resource allocation header = 1 (RA Type 1)<br>Refer to RA Type page |

Fig. 12a-1

| Fig. 12a | Fig. 12a-1 |
|---|---|
| | Fig. 12a-2 |

| | | |
|---|---|---|
| Shift | N/A (1.4 MHz)<br>1 (3 MHz)<br>1 (5 MHz)<br>1 (10 MHz)<br>1 (15 MHz)<br>1 (20 MHz) | Applicable only when Resource allocation header = 1 (RA Type 1)<br>Refer to RA Type page |
| Resource block assignment for RA Type 1 | N/A (1.4 MHz)<br>6 (3 MHz)<br>13 (5 MHz)<br>14 (10 MHz)<br>16 (15 MHz)<br>22 (20 MHz) | Applicable only when Resource allocation header = 1 (RA Type 1)<br>Refer to RA Type page |
| MCS | 5 | |
| HARQ Process | 3 (FDD)<br>4 (TDD) | |
| RV | 2 | |
| TPC for PUCCH | 2 | See Power Control section |
| sGuard Transmission | 2 | 0 – No sGuard transmission<br>1 – 1 additional DL symbol<br>2 – 2 additional DL symbol<br>3 – 3 additional DL symbol |

| Fig. 12a-1 |
|---|
| Fig. 12a-2 |

Fig. 12a

| Format 1 (Release 8) – C-RNTI, SPS C-RNTI | | |
|---|---|---|
| Field Name | Length | Comment |
| Flag for format0/format1A differentiation | 1 | |
| Hopping flag | 1 | |
| N_ULhop | 1 (1.4 MHz)<br>1 (3 MHz)<br>1 (5 MHz)<br>2 (10 MHz)<br>2 (15 MHz)<br>2 (20 MHz) | Applicable only when Hopping flag is set. (Refer to 36.213 Table 8.4-1 an Table 8.4-2) is. |
| Resource block assignment | 5 (1.4 MHz)<br>7 (3 MHz)<br>7 (5 MHz)<br>11 (10 MHz)<br>12 (15 MHz)<br>13 (20 MHz) | See 36.213 8.1 |

| Fig. 12b-1 |
|---|
| Fig. 12b-2 |

GP-Config ::= SEQENCE {
           gp-RNTI C-RNTI OPTIONAL, -- Need OR
           gp-ConfigDL GP-ConfigDL OPTIONAL, -- Need ON
           gp-ConfigUL GP-ConfigUL OPTIONAL, -- Need ON
        }

1252
        GP-ConfigDL ::= CHOICE {
           release NULL,
           setup SEQUENCE {
              sGuard INTEGER (1.. 9),
           }
        }

1254
        GP-ConfigUL ::= CHOICE {
           release NULL,
           setup SEQUENCE {
              sGuard INTEGER (1.. 9),
              }
        }
```

Fig. 12c

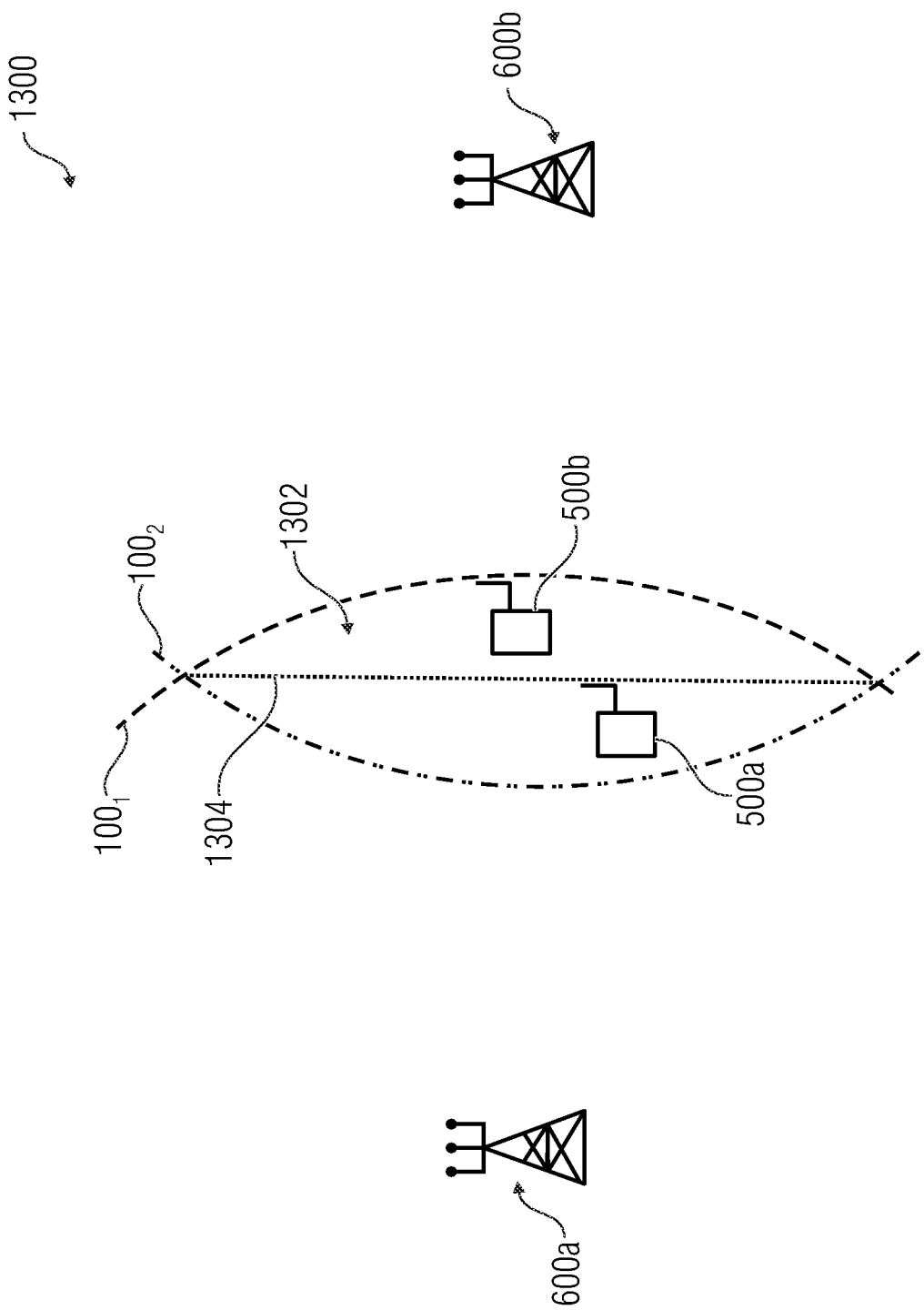

| Field Name | Length (Bits) | Comment |
|---|---|---|
| sGuard coordination over X2 | Multiple of 2 | A scalar value (valid on full band) 0, 1, 2, 3<br>A vector withsGuard Transmission Bits per subband [3, 0, 0, 2, 1] e.g. with subbands |
| sGuard grant duration | | time duration indicator, e.g.<br>1 TTI, 1 radio frame, Integer value denoting TTIs |

Fig. 13c

… # USER EQUIPMENT, BASE STATIONS AND WIRELESS COMMUNICATIONS SYSTEM FOR ULTRA-RELIABLE COMMUNICATIONS

CROSS-REFERENCES TO RELATED APPLICATION

This application is a continuation of copending U.S. patent application Ser. No. 16/401,903 filed May 2, 2019, which is a continuation of International Application No. PCT/EP2017/076678, filed Oct. 19, 2017, which is incorporated herein by reference in its entirety, and additionally claims priority from European Application No. EP 16 197 141.1, filed Nov. 3, 2016, which is incorporated herein by reference in its entirety.

BACKGROUND OF THE INVENTION

The present invention concerns the field of wireless communication networks or systems, more specifically, a user equipment, a base station, methods for operating the same, a wireless communication network and a radio signal. The invention further concerns ultra-reliable low-latency communications, fast transmission in guard period.

Timing advance is a negative offset, at the user equipment (UE), between the start of a received downlink subframe and a transmitted uplink subframe. This offset at the UE is needed to ensure that the downlink and uplink subframes are synchronized at the eNodeB.

A UE far from the eNodeB or eNB encounters a larger propagation delay, so its uplink transmission is somewhat in advance when compared to a UE closer to the eNodeB. With reference to FIG. 14, the principle of Timing Advance is explained using a scenario in which two UEs are present. UE1 is located far from the eNodeB and UE2 is located close to eNodeB. Let $\delta 1$ be the propagation delay experienced on the downlink for UE1 and let $\delta 2$ be the propagation delay experienced on the downlink for UE2. Since UE1 is located with a larger distance from the eNodeB as compared to UE2, it may be assumed that $\delta 1 > \delta 2$. When assuming that the eNodeB has finished transmitting its last DL symbol #n at time t1 which is seen by UE1 at time $t\_u1 = t1 + \delta 1$ and by UE2 at time $t\_u2 = t1 + \delta 2$. Both UE1 and UE2 take the downlink subframe arrival (together with Timing Advance) as a reference to calculate uplink subframe timing.

The Timing Advance is equal to 2× the propagation delay assuming that the same propagation delay value applies to both downlink and uplink directions. So the first UL symbol starts at the eNB at time $t2 = t1 + tGP$, wherein tGP is a duration of the Guard Period. So, UE1 needs to start its uplink at $t2 - 2\delta 1$ whereas UE2 should start its uplink at $t2 - 2\delta 2$. This will ensure that both of the uplink transmissions (from UE1 and UE2) reach the eNodeB at the same time which means that at the eNodeB, both uplink and downlink subframes are time aligned.

It the Timing Advance is not applied, then the start of uplink transmission from UE2 for subframe #n+1 will overlap with the end of uplink transmission from UE1 for a subframe #n. Assuming that the same resource blocks are assigned for UE1 in subframe #n and UE2 in subframe #n+1, this overlap creates interference which causes reception failures at the eNodeB. If a proper value of Timing Advance is applied, then these subframes won't collide.

In other words, in downlink to uplink switching, a guard period is needed, to avoid the time advanced uplink to collide with the delayed downlink.

SUMMARY

According to an embodiment, a user equipment may be configured to operate in a wireless communications network being operated in a TDD scheme, the TDD scheme having a plurality of TDD-frames, each TDD-frame having a guard period arranged between a downlink symbol and an uplink symbol of the TDD-frame, wherein the user equipment is configured to receive a first number of symbols during the guard period; or wherein the user equipment is configured to transmit the uplink symbol and to transmit a second number of symbols previous to transmitting the uplink symbol.

According to another embodiment, a base station may be configured to control a wireless communications network cell of a wireless communications network being operated in a TDD scheme, the TDD scheme having a plurality of TDD-frames, each TDD-frame having a guard period arranged between a downlink symbol and an uplink symbol of the TDD-frame, wherein the base station is configured to transmit a first number of symbols during the guard period; or wherein the base station is configured to receive the uplink symbol and to receive a second number of symbols previous to reception of the uplink symbol.

According to another embodiment, a wireless communications network may have: an inventive base station; an inventive first user equipment; and an inventive second user equipment.

According to another embodiment, a radio signal may have instructions for a user equipment, the instructions instructing the user equipment to receive a first number of symbols during the guard period, the guard period being arranged between a downlink symbol and an uplink symbol of a TDD-frame or instructing the user equipment to transmit the uplink symbol during a subframe and to transmit a second number of symbols previous to transmitting the uplink symbol.

Another embodiment may have a method for operating a user equipment in a wireless communications network being operated in a TDD scheme such that the TDD scheme has a plurality of TDD-frames, each TDD-frame having a guard period arranged between a downlink symbol and an uplink symbol of the TDD-frame, the method having the steps of: Receiving a first number of symbols during the guard period; or Transmitting the uplink symbol and transmitting a second number of symbols previous to transmitting the uplink symbol.

Another embodiment may have a method for operating a base station to control a wireless communications network cell of a wireless communications network being operated in a TDD scheme such that the TDD scheme has a plurality of TDD-frames, each TDD-frame having a guard period arranged between a downlink symbol and an uplink symbol of the TDD-frame, the method having the steps of: Transmitting a first number of symbols during the guard period; or Receiving the uplink symbol and receiving a second number of symbols previous to reception of the uplink symbol.

Another embodiment may have a non-transitory digital storage medium having a computer program stored thereon to perform the method for operating a user equipment in a wireless communications network being operated in a TDD scheme such that the TDD scheme has a plurality of TDD-frames, each TDD-frame having a guard period arranged between a downlink symbol and an uplink symbol of the TDD-frame, the method having the steps of: Receiving a first number of symbols during the guard period; or Transmitting the uplink symbol and transmitting a second number of symbols previous to transmitting the uplink symbol, when said computer program is run by a computer.

Another embodiment may have a non-transitory digital storage medium having a computer program stored thereon to perform the method for operating a base station to control a wireless communications network cell of a wireless communications network being operated in a TDD scheme such that the TDD scheme has a plurality of TDD-frames, each TDD-frame having a guard period arranged between a downlink symbol and an uplink symbol of the TDD-frame, the method having the steps of: Transmitting a first number of symbols during the guard period; or Receiving the uplink symbol and receiving a second number of symbols previous to reception of the uplink symbol, when said computer program is run by a computer.

The inventors have found out that the guard period in TDD mode is under-utilized and that the guard period may be used for transmitting data symbols during the guard period from a base station to a user equipment and/or from a user equipment to a base station. In particular, time periods unused by a user equipment, for example, when it does not need the full duration of the guard period for its Timing Advance, a remaining time period may be used for data transmission in uplink and/or downlink.

According to an embodiment, a user equipment is configured to operate in a wireless communications network, the wireless communications network being operated in a TDD scheme, the TDD scheme comprising a plurality of TDD-frames, each TDD-frame comprising a guard arranged between a downlink symbol and an uplink symbol of the TDD-frame. The user equipment is configured to receive a first number of symbols during the guard period or is configured to transmit the uplink symbol and to transmit a second number of symbols previous to transmitting the up-link symbol. This may allow for an increased number of symbols transmitted in uplink and/or downlink direction and may thus allow for a high throughput in the wireless communications network. According to some embodiments, the user equipment is configured to determine a count of the first number or the second number of symbols based on a Timing Advance of the user equipment in the TDD scheme. The user equipment may have information relating to a maximum duration of the guard period and may also have information relating to its own Timing Advance. Based thereon, the user equipment may determine unused time within the guard period and may thus determine a number of symbols it may receive and/or transmit during the guard period without disturbing regular communication. This may allow for a device dependent usage of additional resources.

Further embodiments provide a base station configured to control a wireless communications network cell of a wireless communications network being operated in a TDD scheme, the TDD scheme comprising a plurality of TDD-frames, each TDD-frame comprising a guard period arranged between arranged between a downlink symbol and an uplink symbol of the TDD-frame. The base station is configured to transmit a first number of symbols during the guard period or is configured to receive the uplink symbol and to receive a second number of symbols previous to reception of the uplink symbol. This may allow for a high throughput of the wireless communications network.

Further embodiments provide a base station being configured to control a user equipment communicating with the base station so as to receive the first number of symbols during the guard period or to control the user equipment so as to transmit the symbols during the subframe and to transmit the second number of symbols previous to transmitting the symbols the subframe. Thus, the base station may be configured to control the user interface so as to utilize additional resources during the guard period. This may allow for a high reliability of the usage of the additional resources.

Further embodiments provide a base station being configured to control a maximum count of the second number of symbols commonly for a plurality of user equipment in the operated wireless communications network cell. For example, the base station may have knowledge of a maximum propagation delay and therefore a maximum timing advance in its cell. It may further have knowledge about a maximum duration of the guard period and may thus determine a number of symbols that may be transmitted during the guard period without disturbing the communication. This may allow for a high reliability of the use of the additional resources as control is performed at a central point.

Further embodiments provide a base station, wherein the base station is configured to control a first user equipment and a second user equipment communicating with the base station. The second user equipment may be controlled so as to receive a third number of symbols during the guard period or to transmit a further uplink symbol and to transmit a fourth number of symbols previous to transmitting the further uplink symbol. The base station is configured to control the first and second user equipment such that at least one of the first number and the second number and at least one of the third number and the fourth number is device dependent for the first and second user equipment. For example, the base station may assign a different number of symbols being transmitted or received during the guard period in addition to the uplink subframes or downlink subframes for the first user equipment and the second user equipment, for example, based on the propagation delay of the respective device. This may allow for a further increase of the systems throughput.

Further embodiments provide a base station being configured to communicate, to a further base station of a wireless communications network, information indicating parameters relating to the first number of symbols to be received by a user equipment during the guard period or indicating parameters relating to the second number of symbols. By informing other base stations about the communication within the guard period, inter cell-interference between base stations may be reduced or prevented.

Further embodiments provide a base station being configured to adapt control of the wireless communications network cell based on information received from a further communications network node, the information indicating parameters relating to a number of symbols to be received by a further user equipment of a further wireless communications network cell during a further guard period or indicating parameters relating to a number of symbols to be transmitted by the further user equipment preceding to a further subframe. By adapting control of the wireless communications network itself, the communication performed therein respectively, inter cell-interference may be low or even prevented.

According to embodiments, a base station is configured to transmit data symbols during a downlink subframe in a first frequency band and to transmit the first number of symbols in a second band. Alternatively or additionally, the base station is configured to receive the symbols during an uplink subframe in the first frequency band and to receive the second number of symbols in the second frequency band. Thus, the additional symbols received or transmitted may be communicated in a different frequency band which may allow for a high flexibility of the scheme and therefore for a high throughput.

Further embodiments provide a wireless communications network comprising a base station according to embodiments described herein and comprising a first and second user equipment according to embodiments described herein.

Further embodiments provide a radio signal providing instructions for a user equipment, the instructions instructing the user equipment to receive a first number of symbols during the guard period, or instructing the user equipment to transmit symbols during a subframe and to transmit a second number of symbols previous to transmitting the symbols during the subframe.

Further embodiments provide a method for operating a user equipment in a wireless communications network being operated in a TDD scheme such that the TDD scheme comprises a plurality of TDD-frames, each TDD-frame comprising a guard period arranged between a downlink symbol and an uplink symbol of the TDD-frame. The method comprises receiving a first number of symbols during the guard period or transmitting the uplink symbol and transmitting a second number of symbols previous to transmitting the uplink symbol.

Further embodiments provide a method for operating a base station to control a wireless communications network cell of a wireless communications network being operated in a TDD scheme such that the TDD scheme comprises a plurality of TDD-frames, each TDD-frame comprising a guard period arranged between a downlink symbol and an uplink symbol of the TDD-frame. The method comprises transmitting a first number of symbols during the guard period or receiving the uplink symbol and receiving a second number of symbols previous to reception of the uplink symbol.

Further embodiments provide a non-transitory computer program product, comprising a computer-readable medium storing instructions which, when executed on a computer, carry out a method according to embodiments described herein.

BRIEF DESCRIPTION OF THE DRAWINGS

Embodiments of the present invention will be detailed subsequently referring to the appended drawings, in which:

FIG. 3a shows a schematic table illustrating different configurations in LTE for switching between downlink and uplink, according to an embodiment;

FIG. 4b shows a schematic diagram showing a possible configuration of the guard period according to an embodiment;

FIG. 4c shows a schematic diagram illustrating the principle of Timing Advance according to LTE;

FIG. 7 shows a schematic block diagram of a wireless communications network according to an embodiment;

FIG. 8 shows a schematic block diagram illustrating a transmission of symbols during the guard period according to an embodiment;

FIG. 10a shows a schematic representation of different lengths of a shortened guard period according to an embodiment;

FIG. 10b illustrates the scenario in accordance with FIG. 10a, wherein the additional symbols are transmitted as downlink symbols according to an embodiment;

FIG. 11 shows a schematic block diagram representing an assignment of the additional symbols according to an embodiment;

FIG. 12a 1-2 shows a schematic table illustrating possible content of a message that may be used for implementing a downlink control information message for assigning additional downlink symbols according to an embodiment;

FIG. 12b 1-2 shows a schematic table illustrating a structure of a possible DCI message for an uplink grant for the special subframe, according to an embodiment;

FIG. 12c shows an example of pseudo code for implementing at least part of a radio resource control message according to an embodiment;

FIG. 13a shows a schematic block diagram of a wireless communications network according to an embodiment;

FIG. 13c shows a schematic table illustrating content of a message being exchanged between base stations, according to an embodiment.

DETAILED DESCRIPTION OF THE INVENTION

In the following, embodiments of the present invention are described in further detail with reference to the enclosed drawings in which elements having the same or a similar function are referenced by the same reference signs.

Figure 1:
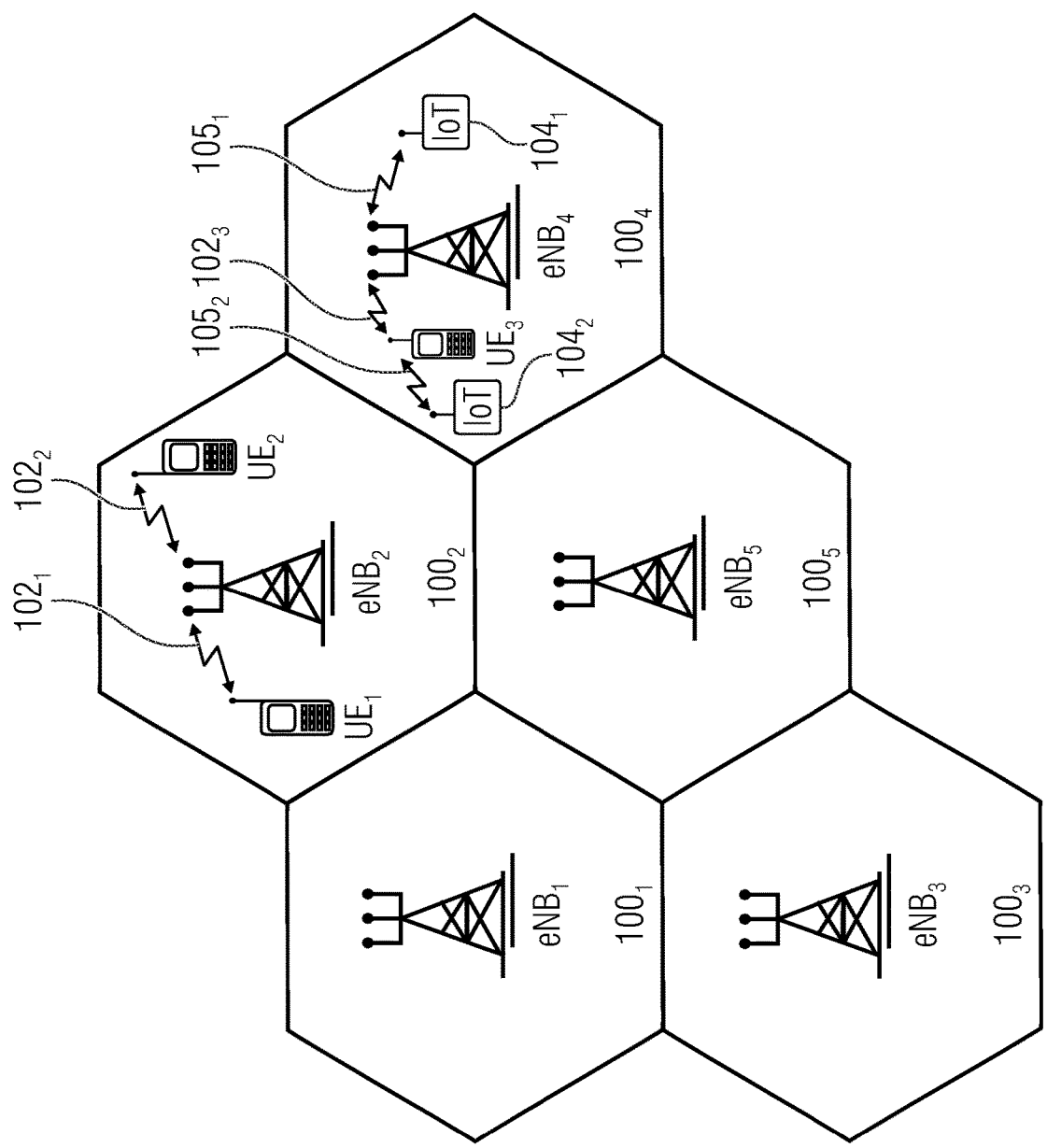
FIG. 1 shows a schematic representation of an example network infrastructure according to an embodiment.

FIG. 1 is a schematic representation of an example of such a network infrastructure, like a wireless communications system including a plurality of base stations eNB1 to eNB5, each serving a specific area surrounding the base station schematically represented by the respective cells 1001 to 1005. The base stations are provided to serve users within a cell. A user may be a stationary device or a mobile device. Further, the wireless communication system may be accessed by IoT devices which connect to a base station or to a user. FIG. 1 shows an exemplary view of only five cells, however, the wireless communication system may include more such cells. FIG. 1 shows two users UE1 and UE2, also referred to as user equipment (UE), that are in cell 1002 and that are served by base station eNB2. Another user UE3 is shown in cell 1004 which is served by base station eNB4. The arrows 102, 1022 and 1023 schematically represent uplink/downlink connections for transmitting data from a user UE1, UE2 and UE3 to the base stations eNB2, eNB4 or for transmitting data from the base stations eNB2, eNB4 to the users UE1, UE2, UE3. Further, FIG. 1 shows two IoT devices 1041 and 1042 in cell 1004, which may be stationary or mobile devices. The IoT device 1041 accesses the wireless communication system via the base station eNB4 to receive and transmit data as schematically represented by arrow 1051. The IoT device 1042 accesses the wireless communication system via the user UE3 as is schematically represented by arrow 1052. UE1, UE2 and UE3 may access the wireless communications system or network by communicating with the base station.

The wireless communications network system may be any single-tone or multicarrier system based on frequency-division multiplexing, like the orthogonal frequency-division multiplexing (OFDM) system, the orthogonal frequency-division multiple access (OFDMA) system defined by the LTE standard, or any other IFFT-based signal with or without CP, e.g. DFT-SOFDM. Other waveforms, like non-orthogonal waveforms for multiple access, e.g. filterbank multicarrier (FBMC), may be used. Other multiplexing schemes like time-division multiplexing (time-division duplex—TDD) may be used.

An OFDMA system for data transmission may include an OFDMA-based physical resource grid which comprises plurality of physical resource blocks (PRBs) each defined by 12 subcarriers by 7 OFDM symbols and including a set of resource elements to which various physical channels and physical signals are mapped. A resource element is made up of one symbol in the time domain and one subcarrier in the frequency domain. For example, in accordance with the LTE standard a system bandwidth of 1.4 MHz includes 6 PRBs, and the 200 kHz bandwidth in accordance with the NB-IoT enhancement of the LTE Rel. 13 standard includes 1 PRB. In accordance with LTE and NB-IoT, the physical channels may include the physical downlink shared channel (PDSCH) including user specific data, also referred to as downlink payload data, the physical broadcast channel (PBCH) including for example the master information block (MIB) or the system information block (SIB), the physical downlink control channel (PDCCH) including for example the downlink control information (DCI), etc. The physical signals may comprise reference signals (RS), synchronization signals and the like. The LTE resource grid comprises a 10 ms frame in the time domain having a certain bandwidth in the frequency domain, e.g. 1.4 MHz. The frame has 10 subframes of 1 ms length, and each subframe includes two slots of 6 or 7 OFDM symbols depending on the cyclic prefix (CP) length.

Figure 2:
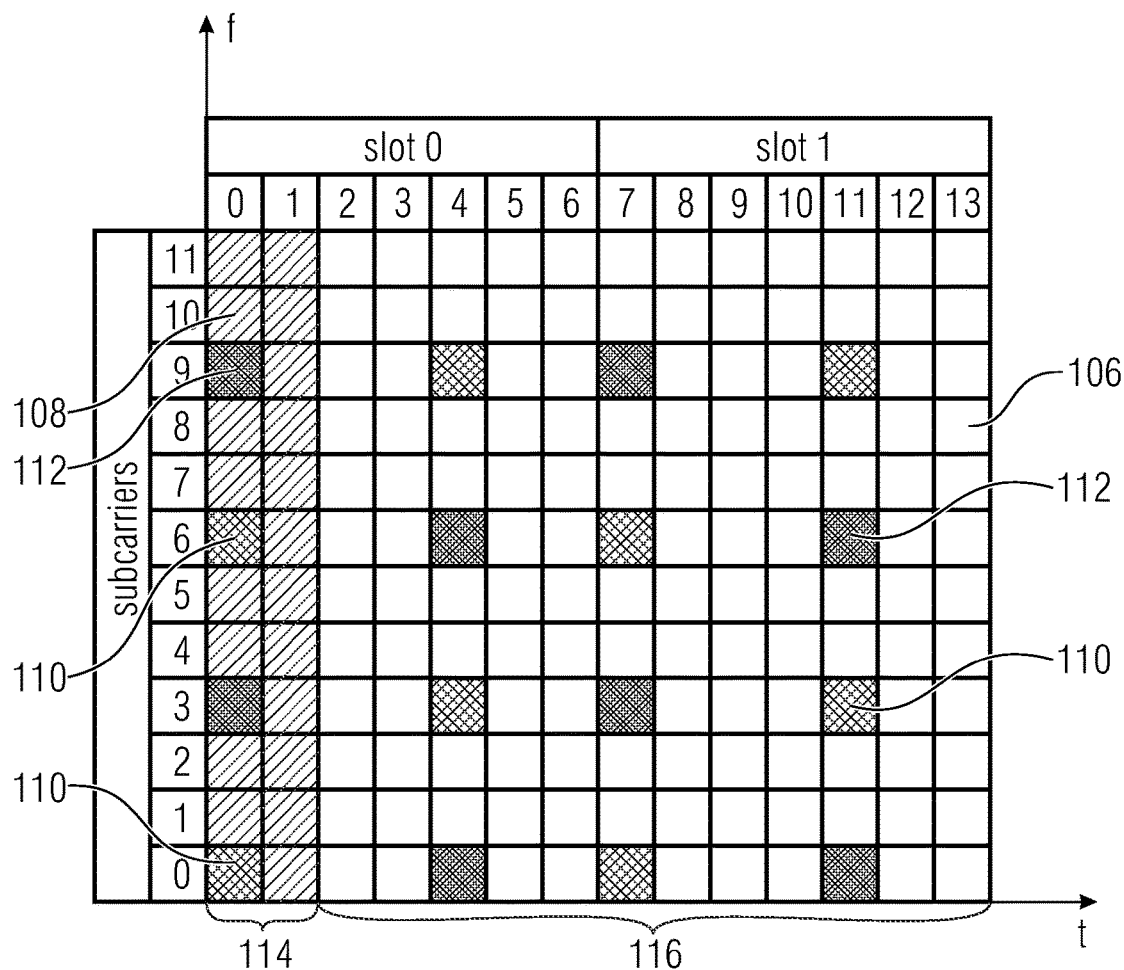
FIG. 2 shows an exemplary LTE OFDMA-based subframe with two antenna ports for different selected Tx antenna ports according to an embodiment.

FIG. 2 shows an exemplary LTE OFDMA-based subframe with two antenna ports for different selected Tx antenna ports. The subframe includes two resource blocks (RB) each made up of one slot of the subframe and 12 subcarriers in the frequency domain. The subcarriers in the frequency domain are shown as subcarrier 0 to subcarrier 11, and in the time domain, each slot includes 7 OFDM symbols, e.g. in the slot 0 OFDM symbols 0 to 6 and in slot 1 OFDM symbols 7 to 13. The white boxes 106 represent resource elements allocated to the PDSCH including the payload or user data, also referred to a payload region. The resource elements for the physical control channels (including non-payload or non-user data), also referred to the control region, are represented by the hatched boxes 103. In accordance with examples, resource elements 103 may be allocated to the PDCCH, to the physical control format indicator channel (PCFICH), and to the physical hybrid ARQ indicator channel (PHICH). The cross-hatched boxes 107 represent resource elements which are allocated to the RS that may be used for the channel estimation. The black boxes 108 represent unused resources in the current antenna port that may correspond to RSs in another antenna port. The resource elements 103, 107, 108 allocated to the physical control channels and to the physical reference signals are not evenly distributed over time. More specifically, in slot 0 of the subframe the resource elements associated with the symbol 0 and the symbol 1 are allocated to the physical control channels or to the physical reference signals, no resource elements in the symbols 0 and 1 are allocated to payload data. The resource elements associated with symbol 4 in slot 0 as well as the resource elements associated with symbols 7 and 11 in slot 1 of the subframe are allocated in part to the physical control channels or to the physical reference signals. The white resource elements shown in FIG. 2 may include symbols associated with payload data or user data and in the slot 0 for symbols 2, 3, 5 and 6, all resource elements 106 may be allocated to payload data, while less resource elements 106 are allocated to payload data in symbol 4 of slot 0, and no resource element is allocated to payload data in symbols 0 and 1. In slot 1, the resource elements associated with symbols 8, 9, 10, 12 and 13 are all allocated to payload data, while for symbols 7 and 11 less resource elements are allocated to payload data.

FIG. 3a illustrates a schematic table illustrating different configurations in LTE. Switching between downlink (D) and uplink (U) is performed at so-called special frames (S). A special frame may comprise a guard period allowing for synchronization of the uploads of different user equipment so as to arrive at the base station at a same time. Different uplink-downlink configurations may relate to different positions of special frames in a radio frame of the communication scheme. For example, subframes $202_1$ may be a special frame in every configuration. Some configurations, such as configuration 0, 1, 2 and 6 may provide a further special frame in subframe $202_6$.

Figure 3B:
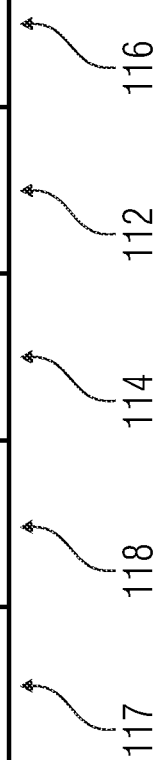
FIG. 3b shows possible configuration for special subframes according to the LTE standard.

In time division duplex (TDD) or time division multiple access (TDMA) configurations with special subframes, the guard period to be used for the Timing Advance is as large as a maximum cell size, i.e., the largest Timing Advance is taken into account. When referring now to FIG. 3b, a possible configuration is shown for the special subframes. It can be seen that the guard period GP vary between one and ten symbols. FIG. 3b shows an overview of an increasing Serve Switching Function (SSF) in diverse configurations in digit 3 GPP. For different configurations Downlink Pilot Time Slot (DwPTS) durations, Uplink Pilot Time Slot (UpPTS) durations and a number of slots for downlink (Dw), guard period (GP) and uplink (Up) are illustrated. A number of slots used for the guard period per subframe may vary between a number of 1 in configurations 4 and 8 to a number of 10 in configuration 0. The number of slots 112 used for the guard period is embedded between slots 114 used for Downlink Pilot Time Slot prior to the guard period and slots used for Uplink Pilot Time Slot following the guard period. A duration 117 or 118 of the number of slots 114 and 116 increase with their number. Thus, a slot onto which the guard period follows is, for example, a downlink slot, wherein a slot following the guard period is an uplink slot.

Figure 4A:
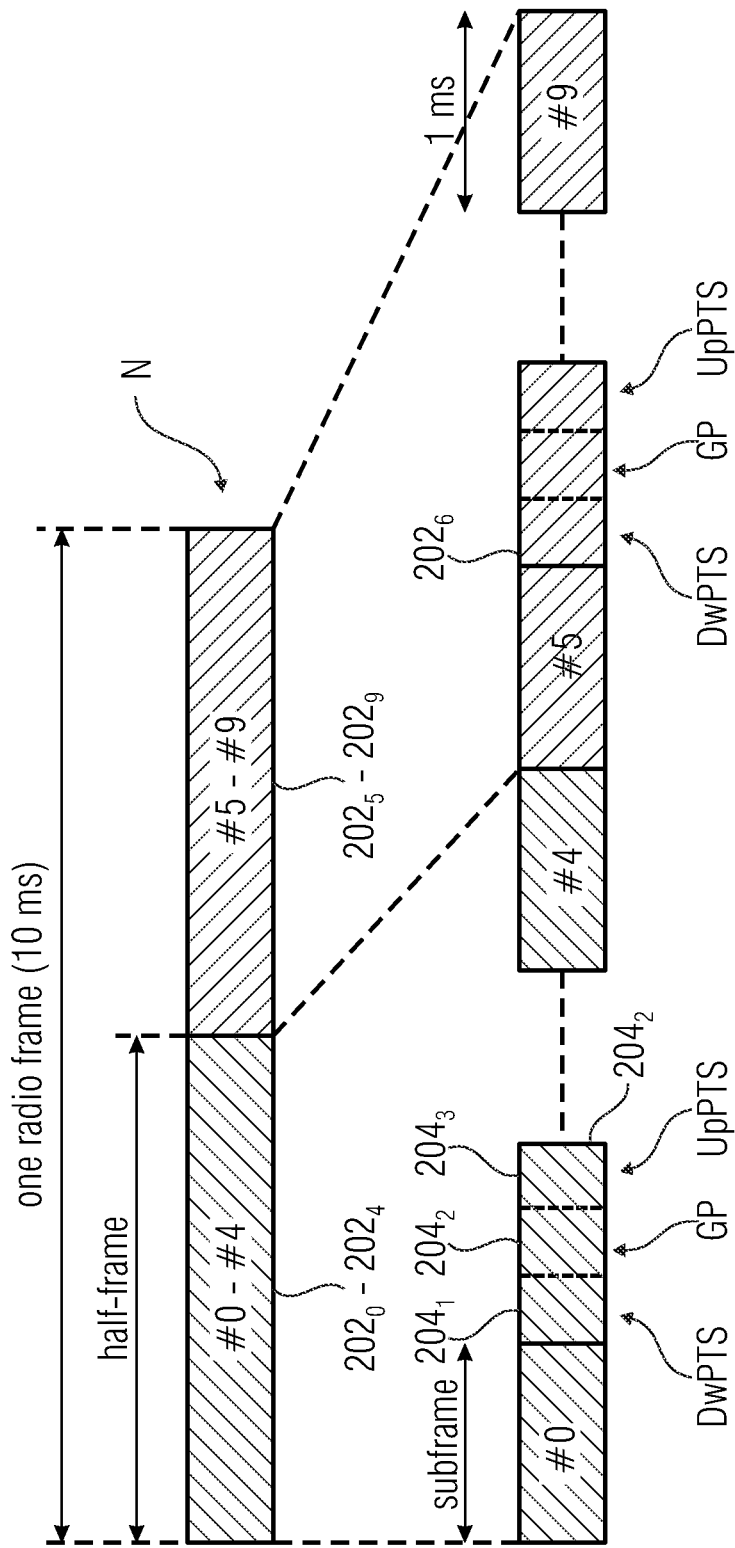
FIG. 4a shows a schematic block diagram representing a radio frame having a duration of 10 ms according to the LTE standard.

FIG. 4a illustrates a schematic block diagram representing a radio frame N having a duration of 10 ms. Subframes $202_0$ to $202_4$ may form a first half-frame of frame N wherein subframes $202_5$ to $202_9$ may form a second half-frame of frame N. Each subframe $202_0$ to $202_9$ may have a duration of 1 ms. When referring to one of the configurations 0, 1, 2 or 6 illustrated in FIG. 3a, subframes $202_1$ and $202_6$ may be a so-called special frame. For example, the subframe $202_1$ comprises a first section $204_1$ being used as downlink pilot time slot (DwPTS) comprising the slots 114, followed by a guard period $204_2$ comprising the slots 112, which is followed by at least one uplink pilot time slot (UpPTS) $204_3$. The at least one uplink slot is described as UpPTS 116 in FIG. 3b. As described with respect to FIG. 3b, during the DwPTS $204_1$ one or more downlink symbols may be transmitted from an eNodeB to a user equipment. DwPTS may comprise one or more symbols being transmitted. During UpPTS one or more symbols being transmitted from the user interface to the eNodeB. Embodiments described herein relate to the guard period such as the guard period of subframe $202_1$ and/or $202_6$. Prior to the guard period, a last symbol is transmitted downlink from the eNodeB to the user equipment. Following the guard period, a first symbol is transmitted uplink from the user equipment to the eNodeB. Although some embodiments described herein relate to a presence of DwPTS and/or UpPTS, the embodiments are not limited hereto. Other embodiments may relate to other types of mobile communication, for example such which may allow a direct switching from downlink to uplink, i.e. in absence of DwPTS and/UpPTS. In such scenarios there may still be a last downlink symbol followed by a guard period followed by a first uplink symbol.

A transmission during subframes, for example, uplink only or downlink only and/or transmission in the DwPTS and/or UpPTS may be referred to herein after as regular transmission. Embodiments described herein relate to an additional transmission of data symbols in downlink direction and/or uplink direction during the guard period. This may be understood as data symbols being received by the user equipment after reception of a last regular symbol such as symbols being received in the DwPTS and/or may be understood as data symbols being transmitted by the user equipment prior to transmission of a first regular symbol such as symbols being transmitted in the UpPTS. This may also be understood as assigning data transmission such as a short Transmission Time Interval (sTTI) during the guard period that may be used for data transmission. This additional data transmission may allow for a high throughput over the wireless channel and may thus allow for a high efficiency of wireless communication.

FIG. 4b shows a schematic diagram illustrating a possible configuration of the guard period $204_2$. As was described in connection with FIG. 3b, a number of slots per subframe reserved for the guard period GP may depend on specifications of the wireless communications standard such as the SSF configuration in LTE. The duration of the guard period $204_2$ may be set by the base station in connection with a maximum size of the cell operated by the base station and/or based on a maximum distance of a user equipment operated in the cell.

FIG. 4c shows a schematic diagram illustrating the principle of Timing Advance. The eNB may transmit frames or subframes which arrive at the user equipment sometime later. The guard period may provide a maximum time for switching between downlink and uplink and may provide for a maximum Timing Advance. As indicated by dotted lines 52, to allow for a synchronized arrival of the uplink frame at the eNB, the UE starts its transmission earlier according to the Timing Advance TA by using some time of the guard period GP such that propagation delay from the eNB to the UE and from the UE to the eNB is compensated. The downlink may be delayed due to a path distance. An uplink Timing Advance may be instructed by the eNB. So, when the Timing Advance is low, the guard period may be larger than needed. According to embodiments described herein, this time may also be used by some user equipment for transmitting additional symbols and/or for receiving additional symbols.

Figure 5:
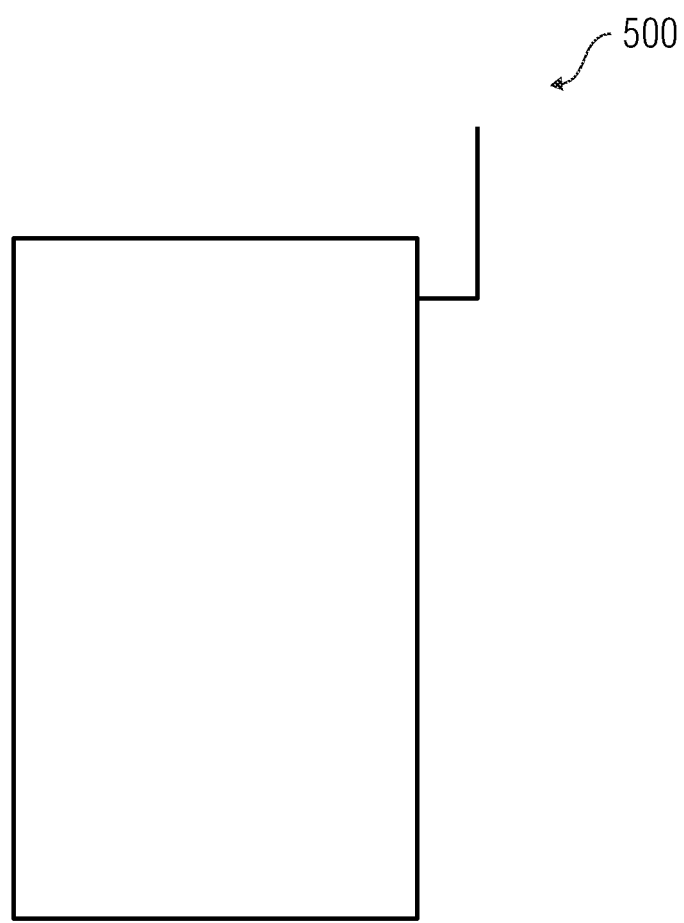
FIG. 5 shows a schematic block diagram of a user equipment according to an embodiment.

FIG. 5 shows a schematic block diagram of a user equipment 500. For example, the user equipment is a mobile terminal or a stationary terminal configured for accessing a wireless network. The user equipment 500 may alternatively be an IoT device. The user equipment 500 is configured to operate in a wireless communications network. The wireless communications network may be operated in a TDD scheme. The TDD scheme may comprise a plurality of TDD-frames, wherein each TDD-frame may comprise a guard period such as the guard period $204_2$ arranged between a downlink symbol and an uplink symbol of the TDD-frame. When referring again to FIG. 3a and FIG. 4a, the downlink symbol may be arranged in a downlink-subframe being transmitted prior to the guard period and/or may be a symbol transmitted during the DwPTS. The uplink symbol may be a symbol transmitted during UpPTS or may be transmitted in an uplink subframe transmitted after the guard period. The user equipment 500 is configured to receive a number of symbols during the guard period. Alternatively or in addition, the user equipment 500 is configured to transmit the uplink symbol and to transmit a number of symbols previous to transmitting the uplink symbol. Simplified, the user equipment is configured to receive additional symbols and/or to transmit additional symbols during the guard period.

As will be described later in more detail, a number of symbols to be received during the guard period and/or to be transmitted previous to transmitting the uplink symbol may be correlated with a Timing Advance used by the user equipment 500. For example, a user equipment using a low Timing Advance in a cell operated by a base station may be correlated with a short time used from the guard period. An example user equipment using a low Timing Advance (TA) may be a fast switching user equipment or a cell center user equipment. As the guard period may be as long as needed by the slowest user equipment or the user equipment most far away in the cell, the guard period may provide time being unused by the user equipment using the low TA. This unused time may at least partially used for an additional number of symbols being received during the guard period and/or for an additional number being transmitted previous to transmitting the regular uplink symbol. Other user equipment may use a high TA, e.g., cell edge UEs. A high Timing Advance may be related to a high amount of the guard period being used for synchronization and may thus be correlated with a low number of symbols being received during the guard period and/or being transmitted prior to transmitting the uplink symbol.

The additional symbols may be used for any purpose such as transmitting data or other signals such as sounding reference signals (SRS). A fine granular configuration may be obtained, for example, when defining a short transmission time interview (sTTI) and/or a ultra-reliable low-latency communications (URLLC) to be used during the guard period.

In other words, the guard period in TDD mode is under-utilized because all user equipment (UEs), cell-center and cell-edge UEs are treated equally with respect to their Timing Advance. For cells in TDD mode, guard periods may be utilized differently, depending on the actual Timing Advance of the user equipment. Thus, cell-center UEs may utilize the guard period in the special subframe for transmitting data or sounding reference signals (SRS) during this period.

Figure 6:
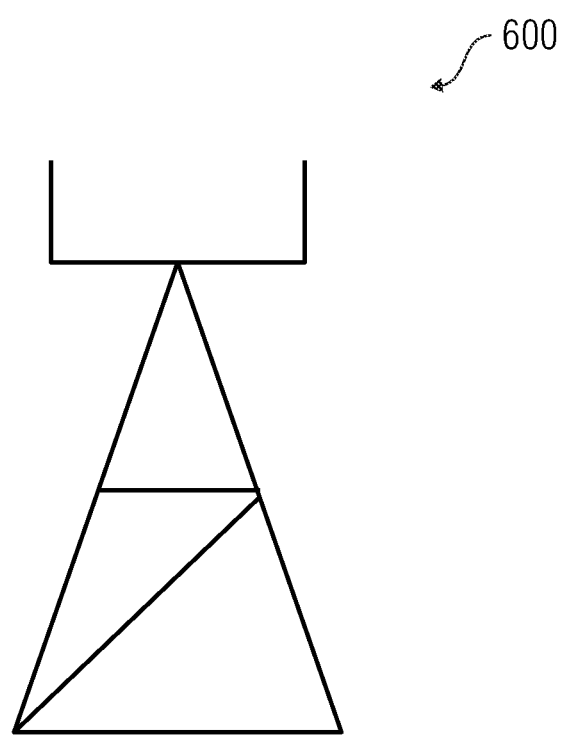
FIG. 6 shows a schematic block diagram of a base station according to an embodiment.

FIG. 6 shows a schematic block diagram of a base station 600 according to an embodiment. The base station 600 is configured to control a wireless communications network cell of a wireless communications network being operated in the TDD scheme. The base station 600 may be configured to operate the wireless communications network in which, for example, the user interface 500 may be operated. The base station 600 is configured to transmit a first number of symbols during the guard period and/or to receive the uplink symbol and to receive a number of symbols prior to reception of the uplink symbol.

FIG. 7 shows a schematic block diagram of a wireless communications network 700 comprising the base station 600 operating a cell 100 of the wireless communications network 700 and comprising a first user equipment 500a and a second user equipment 500b in the cell 100. Although the wireless communications network 700 is described as comprising one base station 600 and two user equipment 500a and 500b in the cell 100, according to other embodiments, the wireless communications network 700 may comprise further base stations and/or further user equipment and/or further cells without limiting the examples described herein.

The user equipment 500b may be a so-called cell-edge user equipment, wherein the user equipment 500a may face a lower propagation delay $\delta 1$ to or from the base station 600 when compared to a propagation delay $\delta 2$ of the user equipment 500b. The propagation delay may be correlated with a distance between the base station 600 and the respective user equipment 500a and 500b. The longer a distance, the longer the propagation delay may be. According to other examples, the user equipment 500b may be located with a lower distance to the base station 600 when compared to the user equipment 500a although comprising a higher propagation delay. For example, due to scattering or other effects, a same or even lower distance may face a higher propagation delay $\delta 1$ or $\delta 2$.

The base station 600 may be configured to operate the cell 100 of the wireless communications network 700 such that a guard period comprises a specific length of time or symbols, for example using configurations as described in connection with FIG. 3b. Based on the smaller distance or propagation delay $\delta 2$, the user equipment 500a may use a lower TA when compared to the user equipment 500b and may thus utilize the guard period in a higher degree for additional data transmission when compared to the user equipment 500b. For example, the user equipment 500a may transmit a higher number of additional symbols and/or may receive a higher number of additional symbols.

FIG. 8 shows a schematic block diagram illustrating a transmission of symbols during the guard period $204_2$ according to an embodiment. Previous to transmitting symbols in the UpPTS $204_3$, for example, in sTTIs $206_2$ to $206_4$, a share or a portion of the guard period $204_2$ may be assigned for data transmission, for example, using an sTTI $206_1$. I.E., FIG. 8 shows a scenario in which a user equipment is configured to transmit data symbols prior to transmitting uplink symbols in sTTI $206_2$.

When referring again to FIG. 3b, a share $208_1$ of the sTTI $206_1$ in the guard period $204_2$ may vary between a number of one single slot and the number of slots reserved for the guard period. Advantageously, the portion varies up to a number of slots-1 so as to keep at least one slot for the guard period. The remaining shortened guard period may be referred to as short guard or sGuard. Thus, although enabling data exchange in the guard period, there may remain a short guard period sGuard comprising a share $208_2$ of the guard period $204_2$ being at least one slot per subframe. For example, when the guard period comprises a length of 10 slots, up to 9 slots may be used from the additional data transmission in the guard period $204_2$. Although the sGuard is described as being arranged between the DwPTS and the additional symbols, the sGuard may alternatively be arranged between the UpPTS and the additional symbols or between an additional symbol used for downlink and an additional symbol used for uplink. A count of the additional symbols for uplink and/or downlink may differ from each other, e.g. may differ device dependently. For example, the count of possible additional uplink symbols of UE 500a may be larger than the count of possible additional uplink symbols for UE 500b. Alternatively, the counts may differ in a different way. For example a sum of additional uplink symbols and downlink symbols may differ from UE to UE. Alternatively a count of additional uplink symbols may differ device dependent.

Figure 9A:
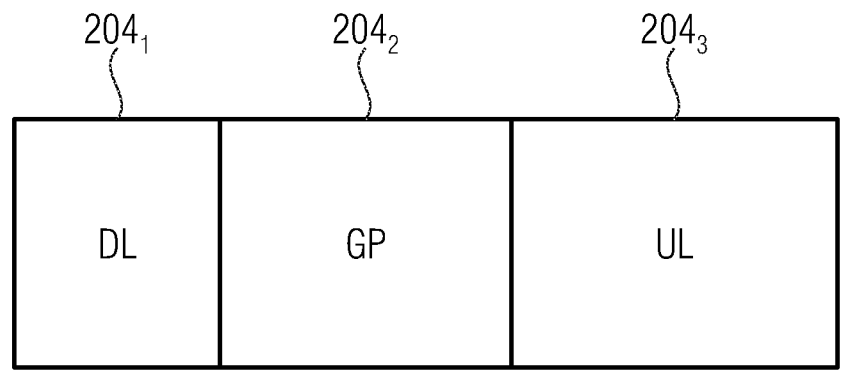
FIG. 9a shows a schematic diagram of an order of downlink pilots, the guard period and uplink pilots in a subframe according to the legacy mode of LTE.

FIG. 9a shows a schematic diagram of an order of DwPTS $204_1$, the guard period $204_2$ and the UpPTS $204_3$ in a subframe according to the legacy mode of LTE.

Figure 9B:
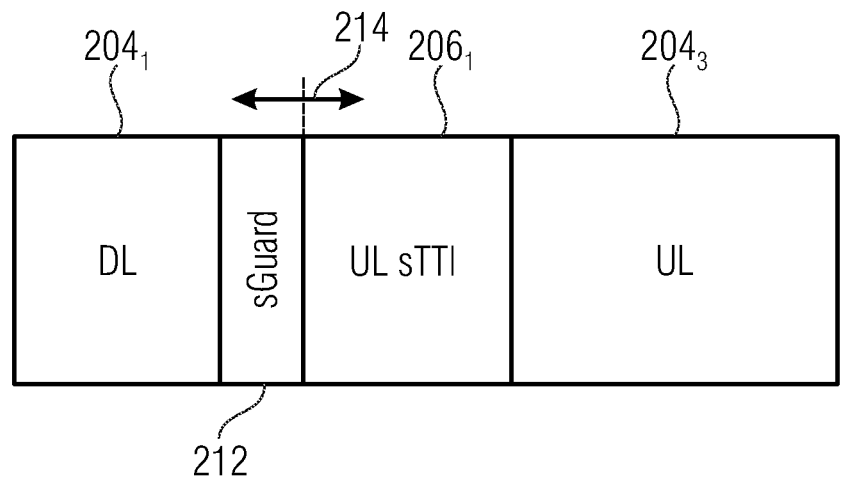
FIG. 9b shows a schematic segmentation of a subframe corresponding to the subframe of FIG. 9a, wherein additional uplink symbols are transmitted in the guard period according to an embodiment.

FIG. 9b shows a schematic segmentation of a subframe corresponding to the subframe of FIG. 9a, wherein the additional symbols are provided in the share $206_1$ for uplink data transmission UL sTTI. As indicated by the arrow 214, a length, duration or an amount of symbols transmitted in the UL sTTI $206_1$ may be varied. For example, based on a configuration provided by a base station such as an eNodeB and may be device dependent. A device dependency may be related to a propagation delay of the device and/or to switching times used by the device. According to embodiments, a base station may be configured to transmit the downlink symbols in a first frequency band and to transmit the first number of symbols in a second frequency band and/or may be configured to receive the uplink symbol in the first frequency band and to receive the second number of symbols in the second frequency band.

Figure 9C:
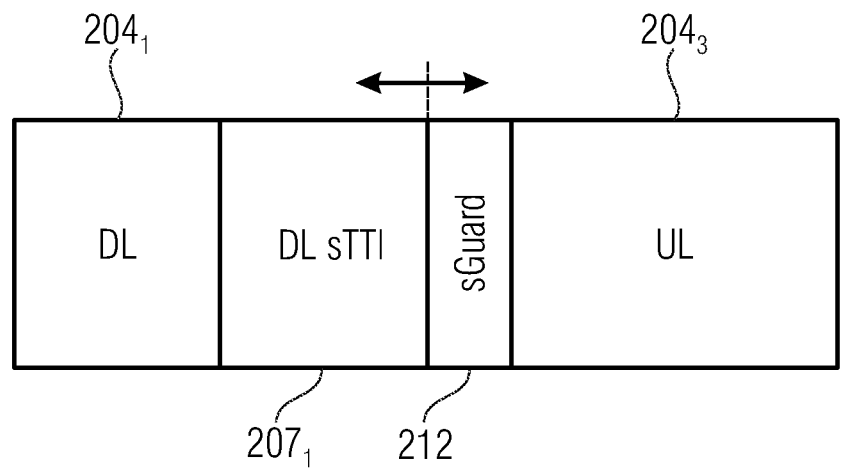
FIG. 9c shows a schematic diagram of the subframe corresponding to the subframe of FIG. 9a, wherein additional downlink symbols are transmitted in the guard period according to an embodiment.

FIG. 9c shows a schematic diagram of the subframe corresponding to the subframe of FIG. 9a, wherein a share $207_1$ may be provided for downlink purpose, i.e. the number of symbols transmitted in the share $207_1$ to be transmitted during the guard period are transmitted after symbols of the DwPTS and before the sGuard 212. Simplified, the base station may be configured to assign a time interval of the guard period $204_2$ for data transmission in the wireless communications network cell so as to reduce a time duration of the guard period at the base station, when compared to a normal operation. Such a reduction may be applicable for user terminals or user equipment that support transmission during the guard period, i.e., user equipment according to embodiments described here.

Thus, the Guard Period may be used for uplink transmission. This may be implemented for UEs that have the capability and meet certain requirements, e.g., processing speed, timing advance, transmit receive switching time or the like. Alternatively or in addition, the Guard Period may be used for downlink transmission. This may be implemented by adding an sTTI in the guard period of the special subframe that may be used by URLLC devices with a small timing advance. Alternatively or in addition, a different transmission start may be set depending on the user equipment. Two or more of those concepts may be combined with each other such as using the guard period for downlink transmission and setting a different transmission start depending on the UE. This may allow for a reduction of the requirements on the processing time. Furthermore, the time of the first sTTI of the subframe may be varied, i.e., additional symbols may be used for uplink. This may be performed device dependent or globally for the wireless communications network itself. An operation mode of the base station and/or of the user equipment in which additional symbols are transmitted during downlink and/or uplink may be signaled to nodes in the network cell and/or to nodes outside the cell. This may be performed, for example, using DCI when introducing a field for downlink and uplink, using RRC configuration and/or using RNTI for activation. Possible values for a count of additional symbols may depend on a length of the guard period and/or the Timing Advance. sTTI modes may allow for a short transmission of only a few OFDM symbols of a subframe or of self-contained frames In other words, in the current LTE, the guard period is fixed. Accounting for the largest processing time and the biggest distance to the eNodeB is performed. This is inefficient because cell-center fast UEs could switch a lot faster and may use this time for transmissions. FIGS. 9b and 9c show a modified subframe allowing for a shorter guard period sGuard and a longer uplink transmission or downlink transmission. Wherein FIG. 9b shows a longer uplink transmission based on UL sTTI, FIG. 9c shows a longer downlink transmission based on DL sTTI. Both concepts may be combined, i.e., a subframe may comprise additional uplink resources $206_1$ and additional downlink resources $207_1$. In such a case, the sGuard 212 may be arranged between the shares $206_1$ and $207_1$.

Thus, the guard period may be reduced for some users such as cell-center UEs and/or fast switching UEs to sGuard so as to provide longer uplink and/or downlink times. Values or an amount of data that may be signaled may depend on the guard period (GP) length and a Timing Advance of the user equipment. Both are known to the user equipment and to the base station. This may be used to reduce signaling overhead by limiting the possible values, i.e., the maximum count of additional symbols during downlink and uplink.

FIG. 10a shows a schematic representation of different lengths of sGuards $212_1$ to $212_3$. As illustrated, at the base station, the DwPTS $204_1$ may end, when the base station has transmitted a last symbol thereof. Three UEs, UE1, UE2 and UE3 may face different propagation delays and may utilize different Timing Advance values TA1, TA2 and TA3, wherein TA1>TA2>TA3. Thus, a share $206_1$-3 of UE3 utilizing the lowest Timing Advance may be higher when compared to a share $206_1$-2 of UE2 utilizing TA2. Timing Advance TA1 may be above a threshold value such that UE1 starts transmission during UpPTS $204_3$, i.e., UE1 may be provided with no additional uplink slots.

FIG. 10b illustrates the scenario in accordance with FIG. 10a, wherein the additional symbols are transmitted as downlink symbols. The lower the Timing Advance of one of the user equipment UE1, UE2 and UE3 are, the larger the share $207_1$-3 or $207_1$-2 may be.

This may allow for a flexibility over frequency and time, i.e., to assign additional symbols to be received are transmitted for each user equipment. Thus, a special subframe may comprise variable sGuard and downlink/uplink transmission start and end times. As mentioned above, additional downlink symbols and additional uplink symbols may be provided together for one or more user equipment. I.E., a user equipment may use additional uplink symbols and additional downlink symbols. Alternatively or in addition, different user equipment may use a device dependent configuration of additional symbols, for example, a first user equipment may use additional downlink symbols and a second user equipment may use additional uplink symbols. Alternatively or in addition, a first user equipment may use additional uplink symbols and additional downlink symbols, wherein a second user equipment may use only additional uplink symbols or only additional downlink symbols or may use no additional symbols.

When referring to FIG. 5, the user equipment 500 may be configured to use a count of additional symbols for uplink and/or downlink purpose. The count of the number of symbols may be related to a Timing Advance of the user equipment 500 in the TDD scheme. By increasing the Timing Advance, the count of the number of symbols may decrease. With the decreasing of the Timing Advance, the count of the number of symbols may increase. The count may be determined by the base station and transmitted to the UE and/or may be determined by the UE as it has knowledge of its TA.

FIG. 11 illustrates a schematic block diagram representing an assignment of the additional symbols according to an embodiment. During DwPTS a first user equipment may receive data 222a from a base station in a first frequency band $f_1$. A second user interface may receive data 222b from the base station in a second frequency band $f_2$, wherein a third user equipment may receive data 222c from the base station in a third frequency band $f_3$. The data 222a, 222b and/or 222c may include the downlink symbol of DwPTS or any other downlink symbol. In the guard period $204_2$ additional downlink symbols 226a may be transmitted in the first frequency band $f_1$. Additional uplink symbols or downlink symbols described herein may be transmitted during the share $206_1$ and/or $207_1$. Furthermore, additional uplink symbols 226b may be transmitted in the first frequency band $f_1$, wherein the symbols 226a and 226b may be separated from each other by the sGuard $212_1$. In the further frequency band $f_3$, additional uplink symbols 226c may be transmitted during the guard period $204_2$. The additional symbols 226a, 226b and 226c may correspond to the portions $206_1$ and/or $207_1$ explained in connection with other embodiments described herein. Each of the frequency bands $f_1$, $f_2$ and $f_3$ may be assigned to a specific user equipment such that the additional symbols 226a and 226b are used by the UE using $f_1$ for reception of data 222a and such that the additional symbols 226c are used by the UE using $f_3$ for reception of data 222c. Alternatively, the additional symbols 226a, 226b and/or 226c may be transmitted from user equipment using a different frequency band for transmitting uplink and downlink data. I.E., a user equipment may be configured to receive downlink symbols such as the downlink symbols 222a in a first frequency band such as the frequency band $f_1$, prior to receiving additional symbols such as the symbols 226c in different frequency band $f_3$. Alternatively or in addition, the user equipment may be configured to transmit uplink symbols such as the uplink symbols 226c in the frequency band $f_3$ and to transmit additional symbols such as the symbols 226b in a different frequency band such as $f_1$.

Each user equipment in the cell may be configured to receive the downlink symbol in a first frequency band previous to receiving the additional number of symbols and to receive the additional number of symbols in a second frequency band f3 or may be configured to transmit the uplink symbol in the first frequency band f1 and to transmit the additional number of symbols in the second frequency band f3. In principle, the user equipment and the base station may be configured to access or to assign additional resources in the guard period. User equipment may transmit and receive additional symbols in a frequency band that differs from the frequency band it which its regular transmission takes place.

Thus, in a wireless communications network, a user equipment may be configured to receive additional symbols, such as the symbols 226a, wherein the same or a different user equipment may be configured to transmit the additional signals 226b. At the base station, such as the base station 600, a time interval may be present between transmission of the symbols 226a and reception of the symbols 226b, i.e., the guard period may be reduced to a non-zero value.

In other words, FIG. 11 shows a flexible guard period in a subframe. This may relate to a fully flexible assignment of the guard period. Several concepts may be used. A longer downlink (220a plus 226a) and a longer uplink transmission (226c plus 224c) in the same carrier by frequency separation (222b plus 224b) This may allow for a more efficient usage of resources be having a user receive in a first frequency band and transmit or send in a different frequency band. Furthermore, user equipment according to embodiments comprising a low Timing Advance such as cell-center UE may be configured to receive a in a first frequency band, wherein cell-edge UEs using a high TA may be controlled to transmit at the same frequency but in the uplink mode, as they use a high Timing Advance, wherein due to the propagation delay, the symbols transmitted very early arrive at the same time at the base station as symbols transmitted later by cell-center UEs. For example, a cell-center UE may receive the additional symbols 226 in the frequency band $f_1$, wherein a cell-edge UE may transmit the symbols 224a in the frequency band $f_1$. The user equipment receiving the symbols 226a may use, for example, the frequency band $f_2$ for transmitting the symbols 224b.

These concepts may reduce the requirements on the user equipment and may still efficiently utilize the guard period for data transmission. A user equipment may be configured to received information indicating where (time and frequency) to receive or transmit additional symbols. Alternatively, the user equipment may be configured to determine at least a count of the additional symbols for a downlink or uplink based on a Timing Advance of the user equipment in the TDD scheme. The Timing Advance may be known by the user equipment. The Timing Advance may be related to a duration or to a number of symbols that might be received or transmitted while keeping at least a minimum duration of the sGuard. This may allow for a simple configuration in which a base station may simply enable the use of the guard period $204_2$ for additional symbols, wherein the user equipment may determine an amount of symbols or a count thereof.

Thus, a base station according to embodiments described herein, such as the base station 600 may be configured to control a user equipment communicating with the base station so as to receive a number of symbols during the guard period $204_2$ and/or to control the user equipment so as to transmit the (first) uplink symbol and to transmit a number of symbols prior to transmitting the uplink symbol.

A base station according to embodiments described herein, such as the base station 600, may be configured to control a maximum count of the number of symbols that may be transmitted additionally by the user equipment. For example, the base station may indicate a minimum duration of the sGuard, i.e., a portion of the guard period $204_2$ that has to remain unused between downlink and uplink.

The base station may be configured to control at least a first and a second user equipment, for example, the user equipment 500a and 500b. Based on the control, each of the user equipment 500a and 500b may receive additional symbols and/or may transmit additional symbols. The base station may be configured to control the user equipment 500a and 500b such that one or more of a count of additional symbols for one of the user equipment 500a or 500b is device dependent for the first user equipment 500a and the second user equipment 500b. For example, device dependence may relate to a distance or propagation delay and/or for a delay caused by switching steps in the user equipment between downlink and uplink.

Control of the user equipment may be performed in a plurality of ways by the base station. FIG. 12a shows a schematic table illustrating possible content of a message 1210 that may be used for implementing a downlink control information (DCI) message for a downlink grant for the special subframe in LTE TDD. The message 1210 may comprise a field 1212 which may be referred to as sGuard Transmission. An entry or a value in the field may specify how many additional symbols are contained in the downlink information, i.e., additional symbols such as the symbols 226a. For example, the field 1212 comprising a length of two bits may allow for 4 different values, wherein each value may be related to a count of additional downlink symbols. For example, a first value, such as zero, may have the meaning that no additional transmission is performed in the guard period $224_2$. A value 1 may be understood as have the meaning that one additional symbol is transmitted. Accordingly, a value of 2 may have the meaning that two additional symbols are transmitted. A value of 3 may have the meaning that three additional symbols are transmitted. These values are illustrative only and shall not limit the embodiments described herein. Each of the values may have a different meaning, i.e., may be associated with a different count of additional bits. Although the DCI message 1210 is described as having the field 1212 comprising a length of 2 bits, other messages and/or other lengths of fields may be used so as to indicate that additional symbols may be transmitted during the guard period $224_2$. For example, a length of 1 bit may already indicate that such an additional transmission is enabled or disabled. As has been previously described, based thereon, a user equipment may determine a count to be used by itself, on its own.

Figures 2, 12B:

FIG. 12b shows a schematic table illustrating a structure of a possible DCI message for an uplink grant for the special subframe in LTE TDD. A field 1232 of the message 1230 may be referred to as sGuard transmission and may comprise a length of, for example, 2 bits. A value of the field 1232 may specify, how many additional symbols may be used for uplink transmission by the user equipment. As has been described in connection with the field 1212, any value of the field 1232 may be interpreted or associated with any count or number of additional uplink symbols, for example, between zero additional symbols and 3 additional symbols. Based on the specific implementation of the wireless communications network cell, other values may be used, for example, having a maximum count of 9 when using a guard period having a length of 10 symbols. In other words, to signal a UE that there is a longer uplink transmission or downlink transmission, a DCI field may be introduced. This may be a simple Boolean if only one length is configured for the UE or one of several lengths may be signaled.

FIG. 12c illustrates an example of pseudo code for implementing at least part of a radio resource control (RRC) message 1250 for controlling a count of additional symbols. The RRC message 1250 may comprise information for turning on the guard period transmission for downlink and/or uplink. For example, a code block 1252 may be implemented so as to comprise instructions that a number of symbols between 1 and 9 may be transmitted during an additional downlink phase such as the symbols 226a. Alternatively or in addition, the message 1250 may comprise a code block 1254 comprising instructions determining that a maximum count of uplink symbols such as the symbols 226b or 226c is to be selected between 1 and 9. The user equipment may use a further identifier in addition to its regular identifier. For example, a user equipment may use a radio network identifier (RNTI) and additionally a guard period radio network temporary identity (gp-RNTI). Alternatively any other identifiers may be used. This may allow for the user equipment being treated as one of two different users in the wireless communications network. When receiving a (control) message using the regular identifier, the user equipment may access the network as a regular or legacy user. When receiving the message using the additional or new identifier, the user equipment may access the network according to embodiments described herein, i.e. it may receive or transmit additional symbols during the guard period. Alternatively, the user equipment may be configured to use the guard period for data transmission and/or may be controlled in a different way. When referring again to RNTI and gp-RNTI, a gp-RNTI scrambled DCI may be used to signal that downlink and uplink grants may be used. The messages or pseudo code provided herein is not limiting examples for realizing embodiments. Other structures or other codes may be used for implementing the embodiments. In other words, using the message 1250 the use of GP transmission may be turned on by the base station using RRC signaling. In other words, a pattern of additional symbols may be semi-static and may be configured by signaling in RRC or in the system information SI. The guard period may be known for user equipment by the resource allocation in time and/or frequency with the DCI. A DCI message containing DL/UL grant for the special subframe (before or after the guard period) may be scrambled either with the normal legacy RNTI or a new gp-RNTI. In the first case, the guard period is preserved. When the new gp-RNTI is used, the guard period may be reduced to sGuard and the additional symbols may be used for DL/UL transmission.

One or more of the messages 1210, 1230 or 1250 may be transmitted by the base station, for example, the base station 600. The base station may be configured to control the user equipment on a transmission time interval level (TTI level) or on a semi-static level. An example for a transmission time interval level is given in connection with the DCI messages 1210 and 1230. An example for semi-static level is given in connection with the RRC message 1250. Controlling the user equipment on a TTI level may allow for a very precise allocation of additional resources as such a message may be transmitted during every resource allocation. In contrast hereto, a semi-static level may remain valid as long as a user equipment remains associated with the base station. This may allow for a low load in the communications channel as a message has only to be sent once. This may be sufficient, for example, when the user equipment determines on its own a count of additional signals, for example, using its TA. In other words, the GP length may depend on the Timing Advance of the specific UE. Activation may be performed through signaling in RRC/SI/DCI/SPS, i.e., may depend on the cell capability. For determining the GP length, further information may be used such as localization information, i.e., coordinates such as GPS coordinates, or information relating to beam formers, i.e., a direction of beams.

FIG. 13a shows a schematic block diagram of a wireless communications network 1300 according to an embodiment. The wireless communications network 1300 may comprise a first base station 600a and a second base station 600b. The base station 600a may be configured to operate a cell $100_1$, wherein the base station 600b may be configured to operate a cell $100_2$ of the wireless communications network 1300. The cells $100_1$ and $100_2$ may overlap in an overlap area 1302. A cell-edge 1304 may be present in the overlap area 1302, but adjacent to the cell-edge user equipment 500a and 500b, may receive signals from each of the base stations 600a and 600b. To reduce inter cell-interference, the base stations 600a and 600b may be configured to exchange information relating to the number of symbols additionally transmitted by the first or second base station 600a or 600b. Alternatively or in addition, at least one of the base stations 600a and 600b may be configured to adapt a number of symbols additionally used for uplink and/or downlink based on the information received from the other base station. Such information may be received from the further base station or any other further communication network node such as a user equipment.

Figure 13B:
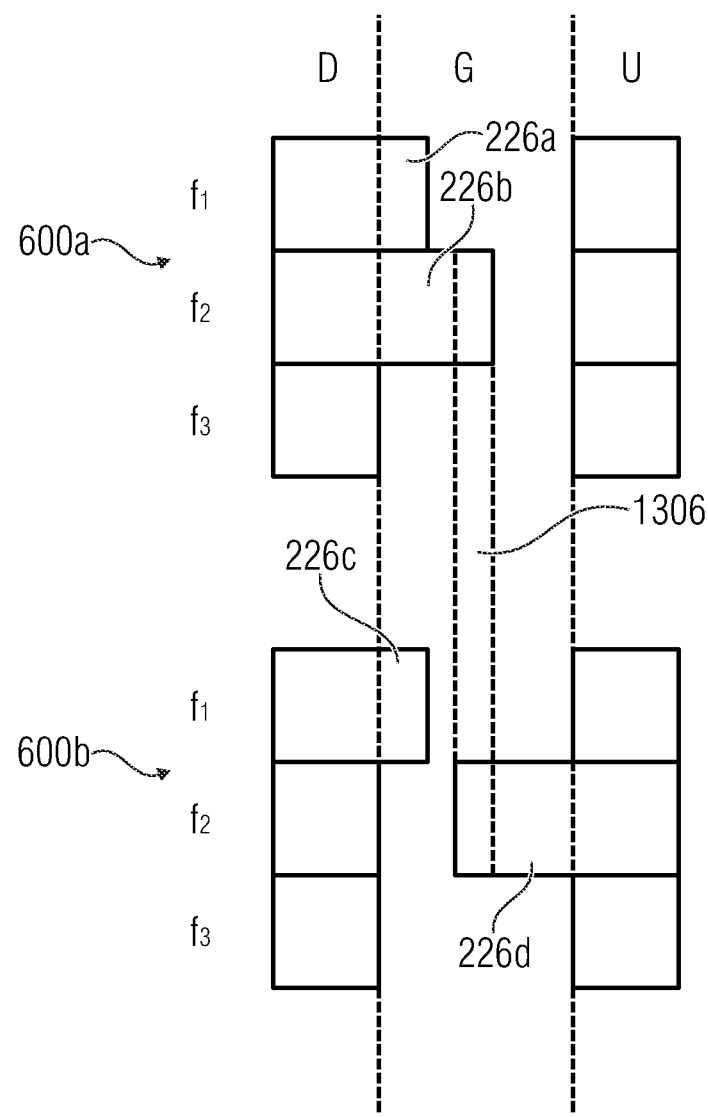
FIG. 13b illustrates a scenario of a wireless communications network preventing inter cell-interference based on the exchange of information, according to an embodiment.
Figure 14:
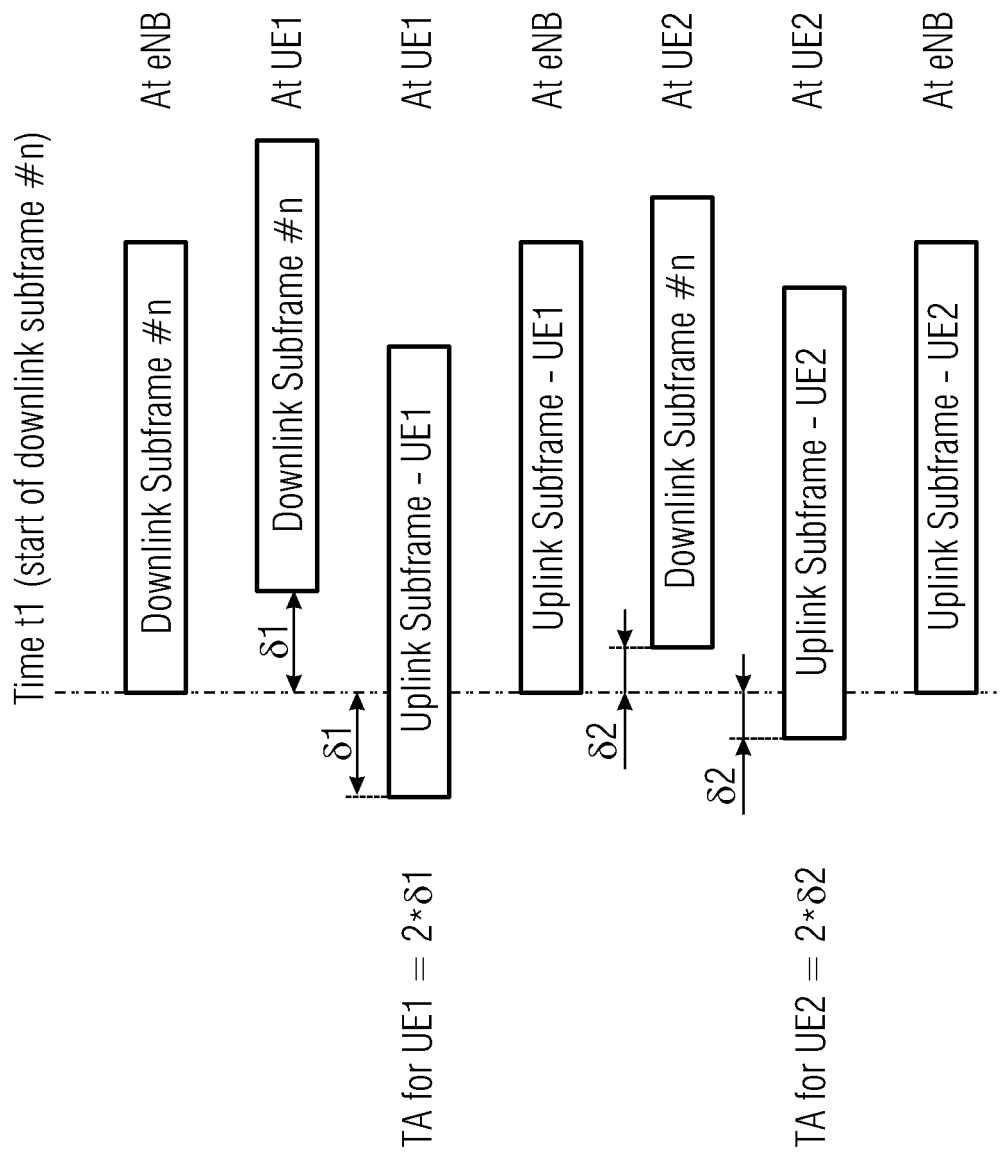
FIG. 14 shows the principle of Timing Advance is explained using a scenario in which two UEs are present, according to LTE.

FIG. 13b illustrates a scenario in which inter cell-interference may occur and which is prevented based on the exchange of information between the base station 600a and 600b in the wireless communications network 1300. For example, the base station 600a plans to additionally transmit symbols 226a in frequency band f1 and additional symbols 226b in frequency band f2. For the same frame, base station 600b plans to additionally transmit symbols 226c in the frequency band $f_1$ and to allow its user equipment to transmit additionally symbols 226d in the frequency band f2. While simultaneously transmitting additional symbols 226a in cell $100_1$ and additional symbols 226c in cell $100_2$ may lead to no or only negligible inter cell-interference, a simultaneous transmission of additional downlink data symbols 226b in the cell $100_1$ and of additional uplink symbols 226d in the cell $100_2$ may lead to significant inter cell-interference. Based on the data exchange between the base stations 600a and 600b and/or based on the adaptation of the number of symbols, for example, reduction of a number of the symbols 226b or of the number of the symbols 226d, such an inter cell-interference may be reduced or prevented. Thus, embodiments described herein relate to coordination between eNodeBs for minimizing interference to one or multiple cells or nodes.

Thus, at least one base station 600a or 600b may be configured to adapt control of the wireless communications network cell, based on information received from the other base station, the information may indicate parameters relating to a number of symbols to be received by a further user equipment of a further wireless communications network cell during a further guard period or indicating parameters relating to a number of symbols to be transmitted by the further user equipment preceding to a further uplink symbol. For example, the user equipment 500a may be associated with the base station 600a, wherein the user equipment 500b may be associated with the base station 600b. By exchanging information between the base stations 600a and 600b how the respective user equipment is operated in the respective cell $100_1$ or $100_2$, both base stations may agree on a count or number of additional symbols and/or on a power level and/or a frequency band at which additional symbols are transmitted so as to provide a high overall throughput in the entire wireless communications network 1300.

In other words, when considering that transmission in neighboring cells 100$_1$ and 100$_2$ may cause interference to other UEs and eNodeBs, a certain degree of coordination between multiple cells allows reduction of a level of collision of UL and DL transmission. Therefore, according to embodiments, multiple eNodeBs, such as the base station 600$a$ and 600$b$ may exchange their targeted sGuard transmission grants. This may be performed on a vector consisting of entries for each sub-band and/or may comprise a scalar, valid for the whole frequency band. In addition, eNodeBs may agree on a time duration for which this setting will be maintained. When no coordination between the base stations is performed, inter cell-interference may occur which may be compensated by corresponding mechanisms such as error correction.

FIG. 13$c$ shows a schematic table illustrating content of a message 1350 being exchanged between the base stations 600$a$ and 600$b$. A field 1352 may comprise information relating to a vector with sGuard transmission bits per sub-band, for example, as described with reference to fields 1212, 1232 and/or 1252/1254, for at least one sub-band or for more than one sub-band. In addition, a field 1354 may comprise information relating to a duration, how long the specification shall be maintained.

Alternatively or in addition, the base station 600$a$ and/or 600$b$ may be configured to communicate to the other base station, information indicating parameters relating to the additional downlinks symbols and/or to the additional uplink symbols. Examples for such a parameter are at which frequencies additional symbols are potentially transmitted or received and/or at which power levels, wherein parameters of UE and eNodeBs may be taken into account. For example, when only transmitting at low power levels, a low amount of inter cell-interference may be accepted by the base stations, when compared to a scenario in which signal quality from and to the UEs is exceptionally high.

Embodiments described herein also relate to a radio signal comprising instructions for a user equipment, wherein the instructions are configured to instruct the user equipment to receive additional symbols during the guard period, the guard period being arranged between a downlink symbol and an uplink symbol, or instructing the user equipment to transmit at least one additional symbol previous to transmitting the uplink symbol.

Further embodiments relate to a method for operating a user equipment. The method comprises receiving a first number of symbols during the guard period and/or transmitting the uplink symbol and transmitting a second number of symbols previous to transmitting the uplink symbol.

Further embodiments relate to a method for operating a base station. The method comprises transmitting a first number of symbols during the guard period or receiving the uplink symbol and receiving a second number of symbols previous to reception of the uplink symbol.

Details described herein relating to a user equipment may complementary correspond to a base station or vice versa. I.E., a symbol received by the user equipment may be transmitted by the base station such that configurations for additionally accessing the guard period applying for either the base station or the user equipment may also apply to the corresponding other communications partner.

Further embodiments relate to a non-transitory computer program product comprising a computer readable medium storing instructions which, when executed on a computer, carry out the method for operating a user equipment and/or the method for operating a base station.

Embodiments described herein allow solving of the problem that the guard period in TDD mode is under-utilized because all UEs, cell-center and cell-edge UEs may be treated equally.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A user equipment configured to operate in a wireless communications network being operated in a Time Division Duplex (TDD) scheme, the TDD scheme comprising a plurality of TDD-frames, each TDD-frame comprising a guard period arranged between a downlink symbol and an uplink symbol of the TDD-frame, wherein the user equipment is configured to receive a first number of symbols during the guard period, wherein the first number of symbols during the guard period is assigned for data transmission in a short Transmission Time Interval (sTTI); or wherein the user equipment is configured to transmit the uplink symbol and to transmit a second number of symbols previous to transmitting the uplink symbol, wherein the second number of symbols during the guard period is assigned for data transmission in a short Transmission Time Interval (sTTI);

wherein the user equipment is configured to determine a count of the first or second number of symbols from a Timing Advance of the user equipment in the TDD scheme.

2. The user equipment of claim 1, wherein the user equipment is configured to receive the first number of symbols during the guard period and to transmit the second number of symbols previous to transmitting the uplink symbol.

3. The user equipment of claim 1, wherein a count of the first number of symbols relates to a Timing Advance of the user equipment in the TDD scheme, wherein by increasing the Timing Advance, the count of the first number of symbols decreases; or wherein a count of the second number of symbols relates to a Timing Advance of the user equipment in the TDD scheme, wherein by increasing the Timing Advance, the count of the second number of symbols decreases.

4. The user equipment of claim 1, wherein the user equipment is a mobile terminal.

5. A wireless communications network comprising:

a base station configured to control a wireless communications network cell of the wireless communications network being operated in a TDD scheme, the TDD scheme comprising a plurality of TDD-frames, each TDD-frame comprising a guard period arranged between a downlink symbol and an uplink symbol of the TDD-frame, wherein the base station is configured to transmit a first number of symbols during the guard period; or wherein the base station is configured to receive the uplink symbol and to receive a second number of symbols previous to reception of the uplink symbol;

a first user equipment and a second user equipment each being implemented according to claim 1.

6. The wireless communications network of claim 5, wherein the first user equipment comprises a first propagation delay to the base station and is configured to receive the first number of symbols during the guard period, or is configured to transmit the second number of symbols preceding uplink symbol;

wherein the second user equipment comprises a second propagation delay to the base station, the second propagation delay being shorter than the first propagation delay, wherein the second user equipment is configured to receive a third number of symbols during the guard period, or is configured to transmit a fourth number of symbols preceding a uplink symbol; and wherein the third number of symbols is larger than the first number of symbols, and wherein the fourth number of symbols is larger than the second number of symbols.

7. The wireless communications network of claim 5, wherein the first user equipment is configured to receive the first number of symbols from the base station and during the guard period;

wherein the second user equipment is configured to transmit a third number of symbols preceding the uplink symbol; and wherein, at the base station, a time interval is present between transmission of the first number of symbols and reception of the third number of symbols.

8. A base station configured to control a wireless communications network cell of a wireless communications network being operated in a Time Division Duplex (TDD) scheme, the TDD scheme comprising a plurality of TDD-frames, each TDD-frame comprising a guard period arranged between a downlink symbol and an uplink symbol of the TDD-frame, wherein the base station is configured to transmit a first number of symbols during the guard period, wherein the first number of symbols during the guard period is assigned for data transmission in a short Transmission Time Interval (sTTI); or wherein the base station is configured to receive the uplink symbol and to receive a second number of symbols previous to reception of the uplink symbol, wherein the second number of symbols during the guard period is assigned for data transmission in a short Transmission Time Interval (sTTI);

wherein the base station is configured to adapt control of the wireless communications network cell based on an information received from a further communications network node, the information indicating parameters relating to a number of symbols to be received by a further user equipment of a further wireless communications network cell during a further guard period or indicating parameters relating to a number of symbols to be transmitted by the further user equipment preceding to a further uplink symbol.

9. The base station of claim 8, wherein the base station is configured to control a user equipment communicating with the base station so as to receive the first number of symbols during the guard period; or to control the user equipment so as to transmit the uplink symbol and to transmit the second number of symbols previous to transmitting the uplink symbol.

10. The base station of claim 9, wherein the base station is configured to control a maximum count of the second number of symbols commonly for a plurality of user equipment in the operated wireless communications network cell based on a maximum propagation delay and/or a maximum timing advance in its cell and/or based on a maximum duration of the guard period.

11. The base station of claim 8, wherein the user equipment is a first user equipment;

wherein the base station is configured to control a second user equipment communicating with the base station so as to receive a third number of symbols during the guard period or to transmit a further uplink symbol and to transmit a fourth number of symbols previous to transmitting the further uplink symbol; and wherein the base station is configured to control the first and second user equipment such that at least one of the first number and the second number and at least one of the third number and the fourth number is device dependent for the first and second user equipment.

12. The base station of claim 8, wherein the base station is configured to communicate, to a further base station, information indicating parameters relating to the first number of symbols to be received by a user equipment during the guard period or indicating parameters relating to the second number of symbols.

13. The base station of claim 8, wherein the base station is configured to
transmit the downlink symbol in a first frequency band and to transmit the first number of symbols in a second frequency band; or
receive the uplink symbol in the first frequency band and to receive the second number of symbols in the second frequency band.

14. The base station of claim 8, wherein the base station is configured to control the user equipment on a transmission time interval level or on a semi static level.

15. The base station of claim 8, wherein the base station is configured to assign a time interval of the guard period for data transmission in the wireless communications network cell so as to reduce a time duration of the guard period at the base station, when compared to a normal operation.

16. A method for operating a user equipment in a wireless communications network being operated in a Time Division Duplex (TDD) scheme such that the TDD scheme comprises a plurality of TDD-frames, each TDD-frame comprising a guard period arranged between a downlink symbol and an uplink symbol of the TDD-frame, the method comprising:
Receiving a first number of symbols during the guard period such that the first number of symbols during the guard period is assigned for data transmission in a short Transmission Time Interval (sTTI); or
Transmitting the uplink symbol and transmitting a second number of symbols previous to transmitting the uplink symbol such that the second number of symbols during the guard period is assigned for data transmission in a short Transmission Time Interval (sTTI);
such that a count of the first or second number of symbols is determined from a Timing Advance of the user equipment in the TDD scheme.

17. A method for operating a base station to control a wireless communications network cell of a wireless communications network being operated in a Time Division Duplex (TDD) scheme such that the TDD scheme comprises a plurality of TDD-frames, each TDD-frame comprising a guard period arranged between a downlink symbol and an uplink symbol of the TDD-frame, the method comprising:
Transmitting a first number of symbols during the guard period such that the first number of symbols during the guard period is assigned for data transmission in a short Transmission Time Interval (sTTI); or
Receiving the uplink symbol and receiving a second number of symbols previous to reception of the uplink symbol such that the second number of symbols during the guard period is assigned for data transmission in a short Transmission Time Interval (sTTI);
such that the base station adapts control of the wireless communications network cell based on an information received from a further communications network node, the information indicating parameters relating to a number of symbols to be received by a further user equipment of a further wireless communications network cell during a further guard period or indicating parameters relating to a number of symbols to be transmitted by the further user equipment preceding to a further uplink symbol.

18. A non-transitory digital storage medium having a computer program stored thereon to perform a method for operating a user equipment in a wireless communications network being operated in a Time Division Duplex (TDD) scheme such that the TDD scheme comprises a plurality of TDD-frames, each TDD-frame comprising a guard period arranged between a downlink symbol and an uplink symbol of the TDD-frame, the method comprising:
Receiving a first number of symbols during the guard period such that the first number of symbols during the guard period is assigned for data transmission in a short Transmission Time Interval (sTTI); or
Transmitting the uplink symbol and transmitting a second number of symbols previous to transmitting the uplink symbol, such that the second number of symbols during the guard period is assigned for data transmission in a short Transmission Time Interval (sTTI),
such that a count of the first or second number of symbols is determined from a Timing Advance of the user equipment in the TDD scheme;
when said computer program is run by a computer.

19. A non-transitory digital storage medium having a computer program stored thereon to perform a method for operating a base station to control a wireless communications network cell of a wireless communications network being operated in a Time Division Duplex (TDD) scheme such that the TDD scheme comprises a plurality of TDD-frames, each TDD-frame comprising a guard period arranged between a downlink symbol and an uplink symbol of the TDD-frame, the method comprising:
Transmitting a first number of symbols during the guard period such that the first number of symbols during the guard period is assigned for data transmission in a short Transmission Time Interval (sTTI); or
Receiving the uplink symbol and receiving a second number of symbols previous to reception of the uplink symbol such that the second number of symbols during the guard period is assigned for data transmission in a short Transmission Time Interval (sTTI),
such that the base station adapts control of the wireless communications network cell based on an information received from a further communications network node, the information indicating parameters relating to a number of symbols to be received by a further user equipment of a further wireless communications network cell during a further guard period or indicating parameters relating to a number of symbols to be transmitted by the further user equipment preceding to a further uplink symbol,
when said computer program is run by a computer.

* * * * *